United States Patent
Jeong et al.

(10) Patent No.: US 8,184,702 B2
(45) Date of Patent: May 22, 2012

(54) METHOD FOR ENCODING/DECODING A VIDEO SEQUENCE BASED ON HIERARCHICAL B-PICTURE USING ADAPTIVELY-ADJUSTED GOP STRUCTURE

(75) Inventors: Se Yoon Jeong, Daejeon (KR); Kyu Heon Kim, Daejeon (KR); Jin Woo Hong, Daejeon (KR); Gwang Hoon Park, Sungnam (KR); Min Woo Park, Kyunggi-do (KR)

(73) Assignees: Electronics and Telecommunications Research Institute, Daejeon (KR); Kyunghee University, Kyunggi-do (KR)

( * ) Notice: Subject to any disclaimer, the term of this patent is extended or adjusted under 35 U.S.C. 154(b) by 1365 days.

(21) Appl. No.: 11/577,329

(22) PCT Filed: Oct. 31, 2005

(86) PCT No.: PCT/KR2005/003630
§ 371 (c)(1),
(2), (4) Date: Apr. 16, 2007

(87) PCT Pub. No.: WO2006/049412
PCT Pub. Date: May 11, 2006

(65) Prior Publication Data
US 2007/0247549 A1    Oct. 25, 2007

(30) Foreign Application Priority Data

Nov. 1, 2004 (KR) .................. 10-2004-0087801
Jan. 10, 2005 (KR) .................. 10-2005-0002242
Apr. 16, 2005 (KR) .................. 10-2005-0031714
Jul. 27, 2005 (KR) .................. 10-2005-0068497

(51) Int. Cl.
*H04N 7/12* (2006.01)
*H04N 11/04* (2006.01)
*H04N 11/02* (2006.01)
*G06K 9/46* (2006.01)

(52) U.S. Cl. ......... 375/240.16; 375/240.01; 375/240.13; 382/250

(58) Field of Classification Search .............. 375/240
See application file for complete search history.

(56) References Cited

U.S. PATENT DOCUMENTS

2001/0031096 A1* 10/2001 Schwartz et al. ............. 382/250
(Continued)

FOREIGN PATENT DOCUMENTS

JP    11-289546    10/1999
(Continued)

OTHER PUBLICATIONS

Gosse et al. "MMSE Design of Modulated and Tree-Structured Filter Banks for Efficient Tradeoffs Between Rate, Distortion, and Decoder Complexity", IEEE Transactions on Circuits and Systems—II: Analog and Digital Signal Processing, vol. 45, No. 8, Aug. 1998.*

(Continued)

*Primary Examiner* — Joseph Ustaris
*Assistant Examiner* — Xiaolan Xu
(74) *Attorney, Agent, or Firm* — Ladas & Parry LLP

(57) ABSTRACT

Provided is a method for performing hierarchical B picture-based coding on a video sequence using the structure of adaptively divided group of pictures (GOP). The method includes the steps of, for each predefined $2^N$ frame-sized group of pictures (GOP) of the video sequence, (a) encoding the $2^N$ frame-sized GOP of the video sequence based on each of the different GOP sizes from the maximum size, $2^N$, to the minimum size, $2^M$ (M is an integer between 1 and N) and obtaining different values between frames reconstructed after the encoding is performed and frames after the hierarchical B-picture prediction is performed, based on each of the different GOP sizes; (b) selecting at least one sub-GOP based on the difference values obtained by encoding the $2^N$ frame-sized GOP of the video sequence based on each of the different GOP sizes; and (c) generating a bitstream by encoding the $2^N$-frame-sized GOP based on the at least one selected sub-GOP. Thereby, the hierarchical B picture-based video coding is performed by adaptively dividing the GOP size based on performance and thereby obtains high coding efficiency.

19 Claims, 21 Drawing Sheets

U.S. PATENT DOCUMENTS

2003/0133502 A1* 7/2003 Yagasaki et al. ......... 375/240.13
2004/0008766 A1* 1/2004 Wang et al. .............. 375/240.01

FOREIGN PATENT DOCUMENTS

| KR | 1019990067723 | 8/1999 |
| --- | --- | --- |
| WO | WO2004/025965 | 3/2004 |

OTHER PUBLICATIONS

Jeong, S., et al., "A Study on Adaptive GOP Structure for SVC." Dec. 29, 2005. *Journal of Broadcast Engineering*, pp. 463-473.

Park, M.W., et al., "Adaptive GOP Structure for Joint Scalable Video Coding." Feb. 2007, *IEICE Trans. Commun.*, vol. E90-B, No. 2, pp. 431-434.

Yoneyama, A., et al., "MPEG Encoding Algorithm with Scene Adaptive Dynamic GOP Structure." Sep. 13-15, 1999, *IEEE 3rd Workshop on Multimedia Signal Processing*, pp. 297-302.

Akyol, E., et al., "Motion-Compensated Temporal Filtering Within the H.264/AVC Standard." Oct. 24-27, 2004. *ICIP '04, 2004 International Conference on Image Processing*, vol. 4, pp. 2291-2294.

Chen, P., et al., "Video Coding for Digital Cinema." Sep. 22-25, 2002. *Proceedings, 2002 International Conference on Image Processing*, vol. 1, pp. I-749-I-752.

Yoeyama, A., et al., "One-pass VBR MPEG Encoder using Scene Adaptive Dynamic GOP Structure." Jun. 19-21, 2001. *2001 ICCE International Conference on Consumer Electronics*.

\* cited by examiner

[Figure 1]
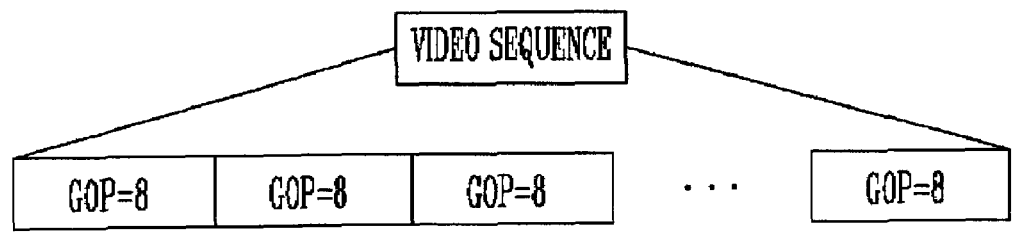
[Figure 2]
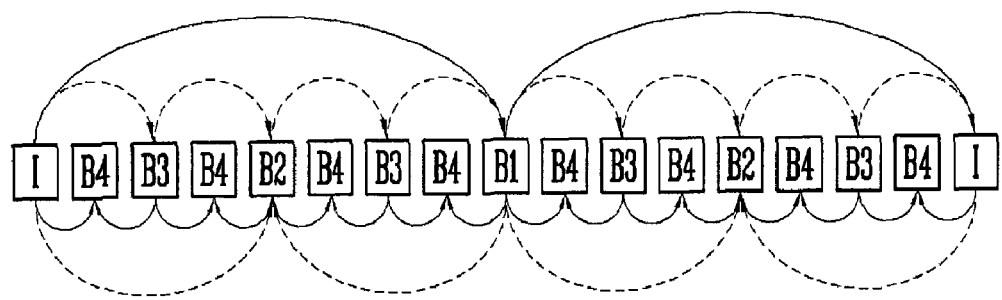
[Figure 3]
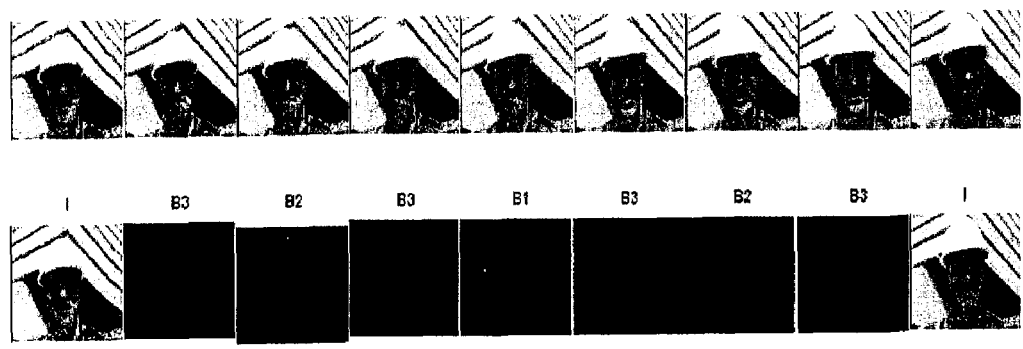

[Figure 4]
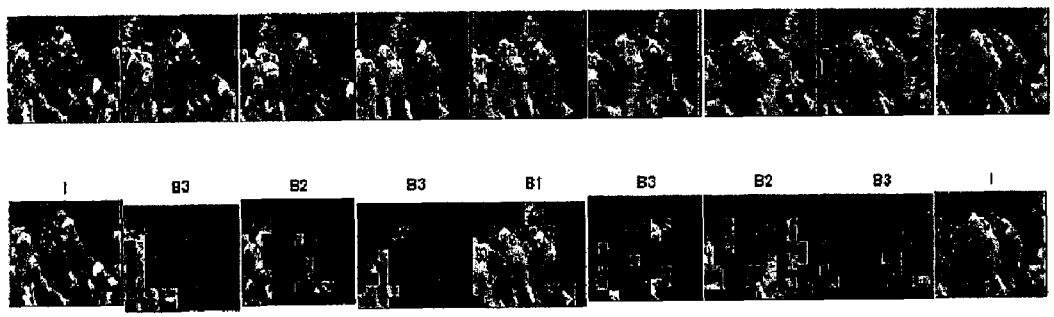
[Figure 5]
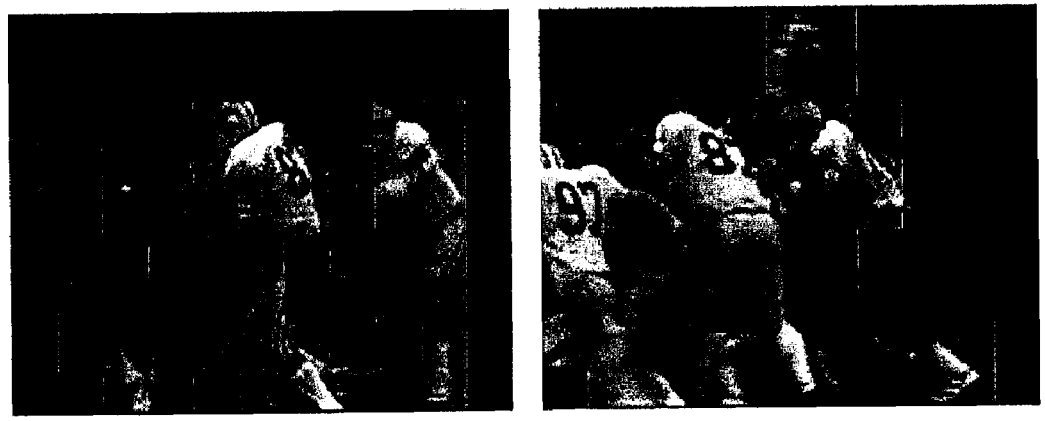

[Figure 6]
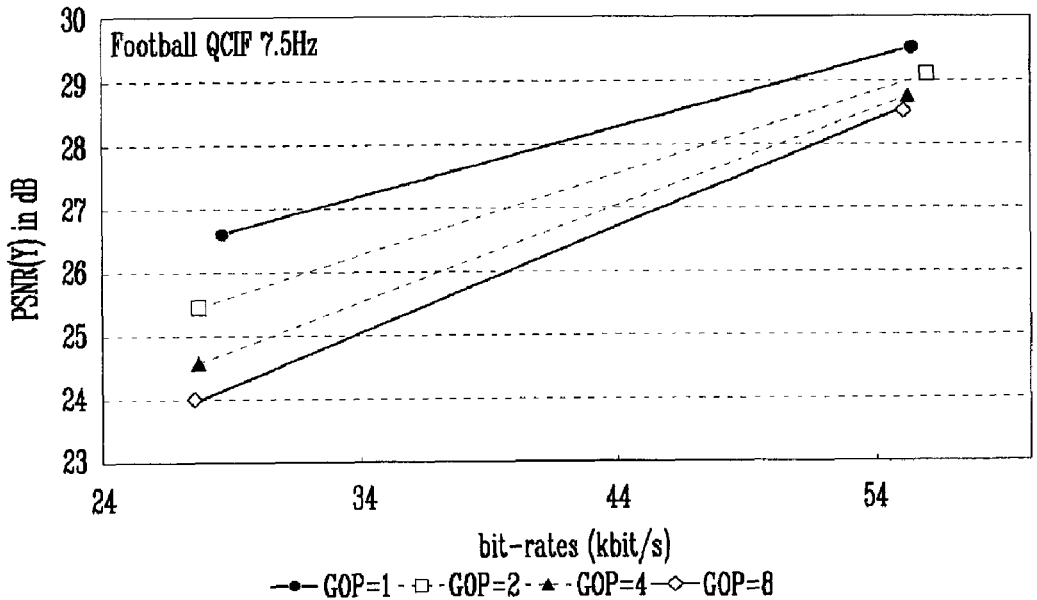
[Figure 7]
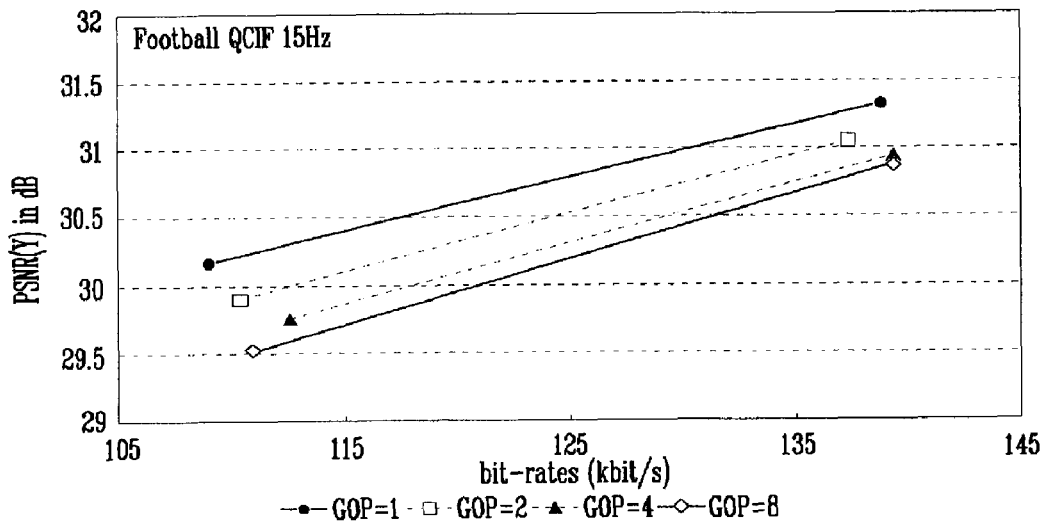

[Figure 8]
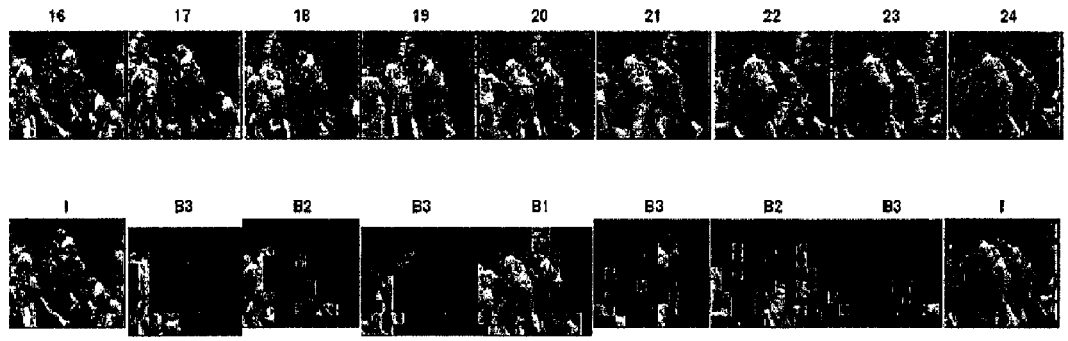
[Figure 9]
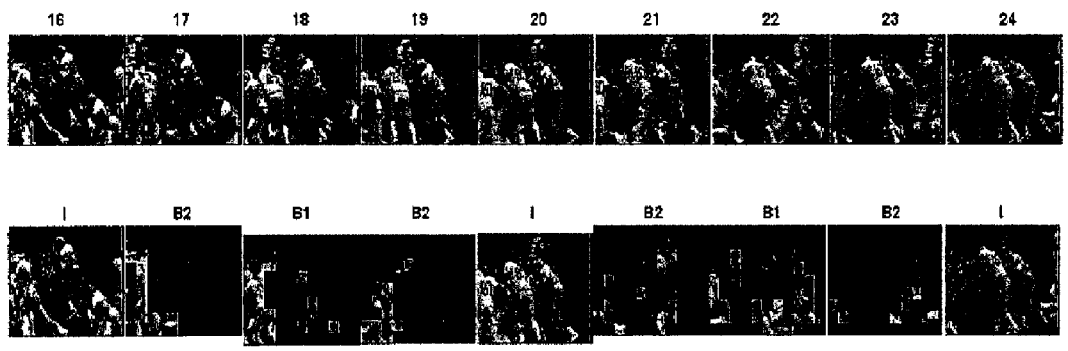
[Figure 10]
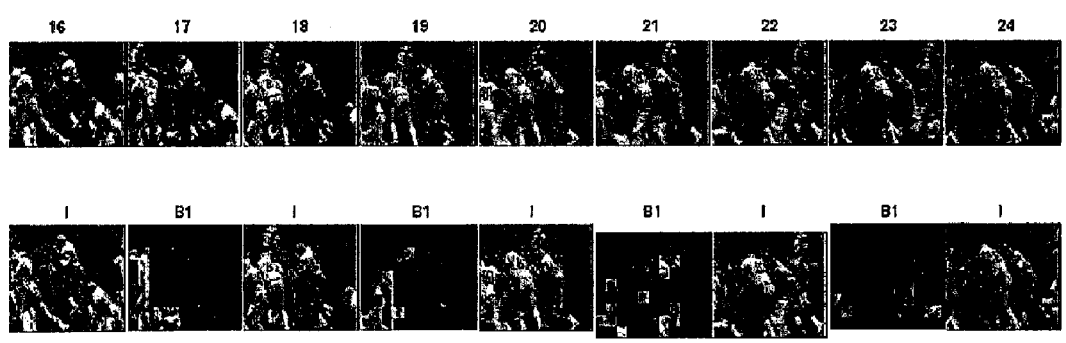

[Figure 11]
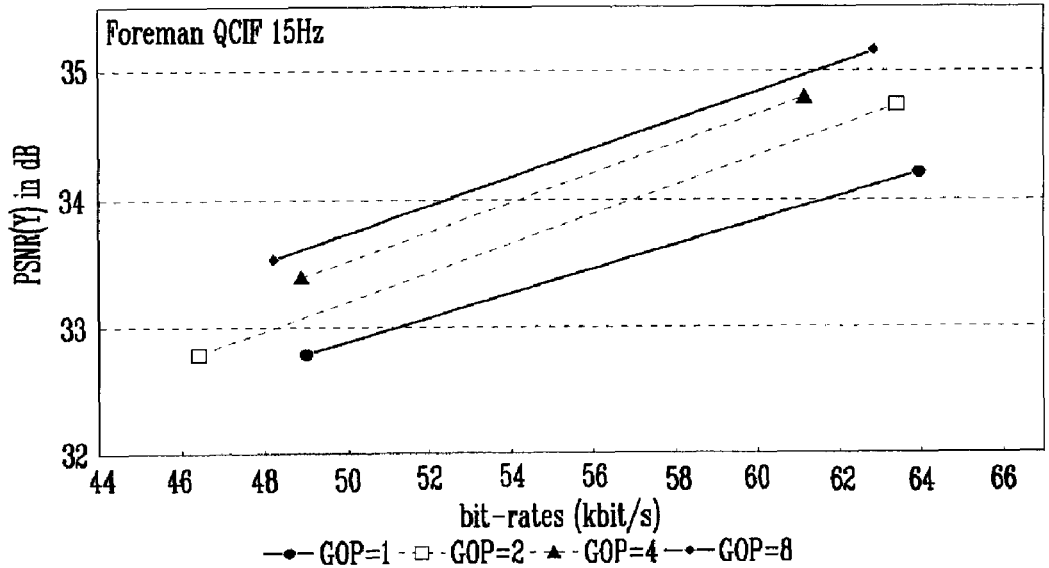
[Figure 12]
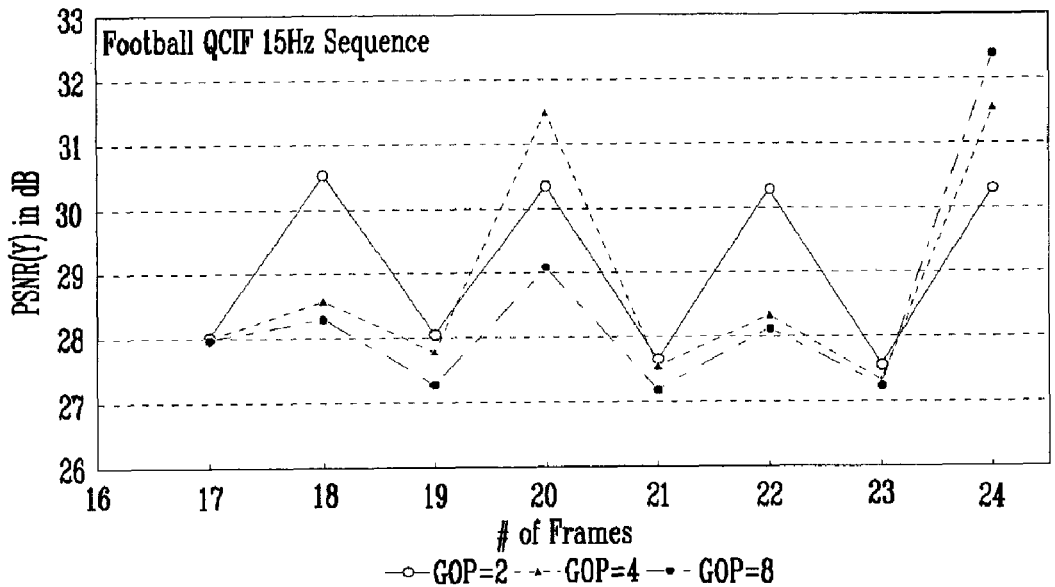

[Figure 13]
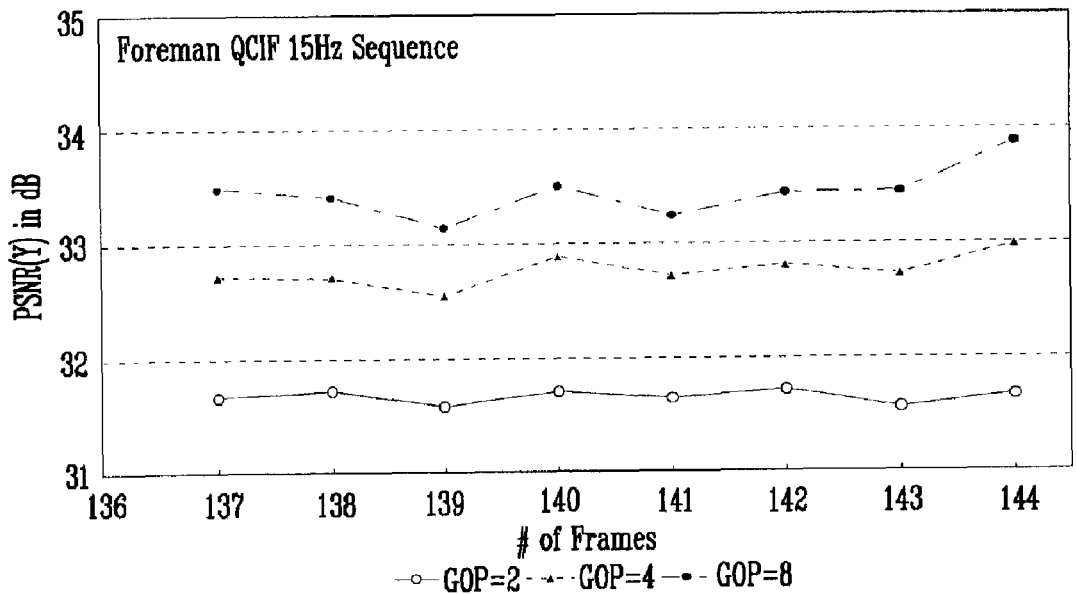
[Figure 14]
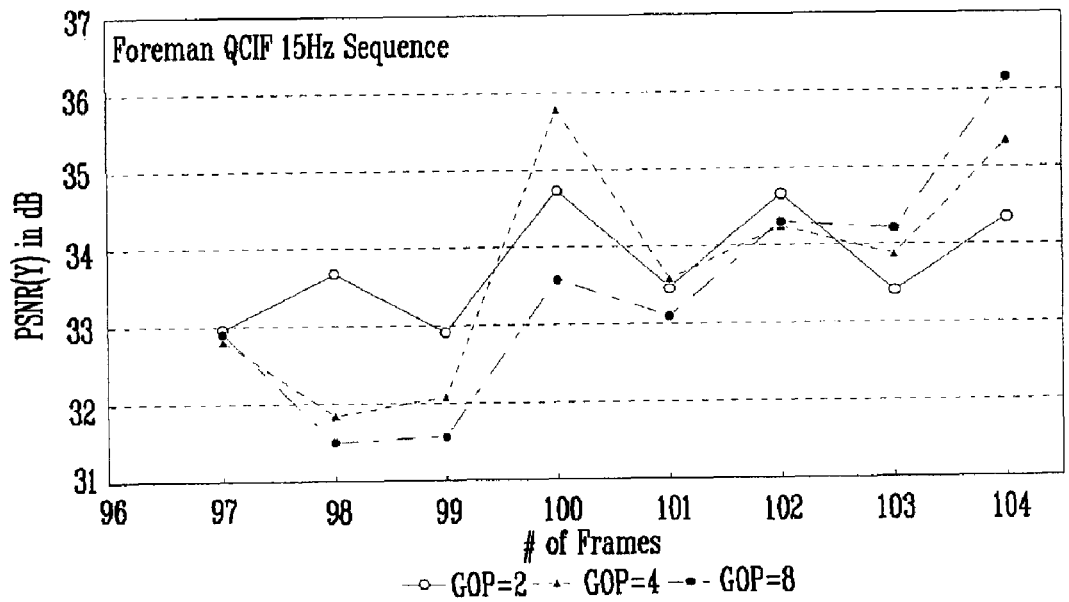

[Figure 15]
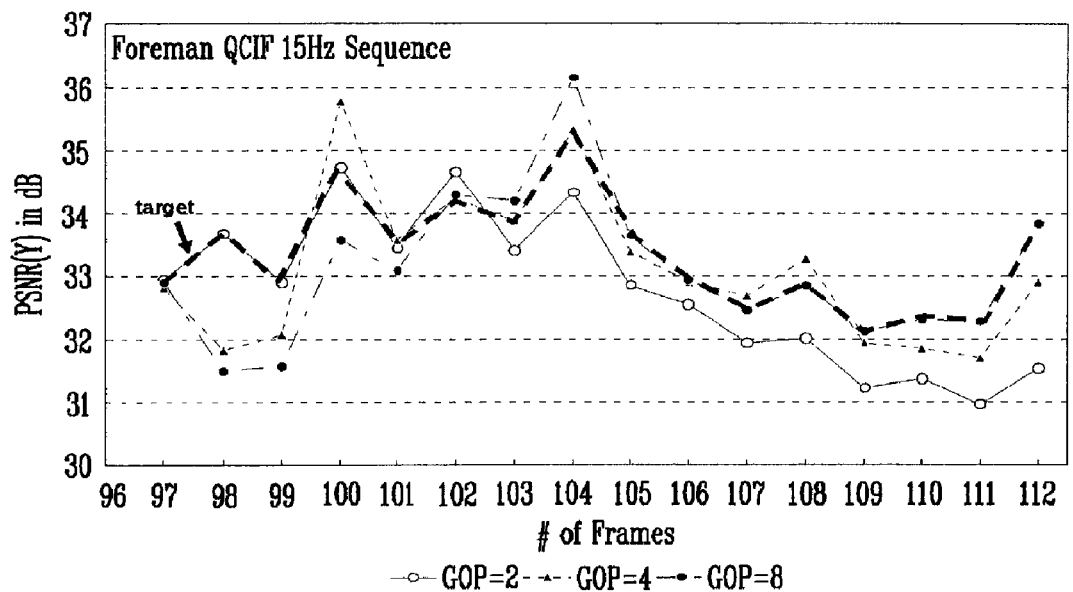
[Figure 16]
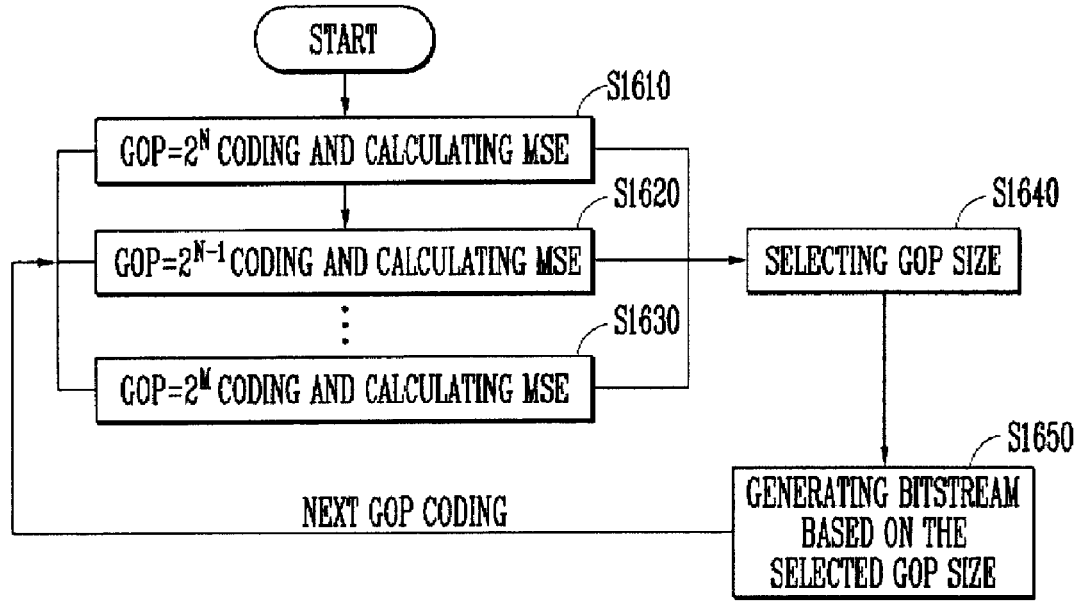

[Figure 17]
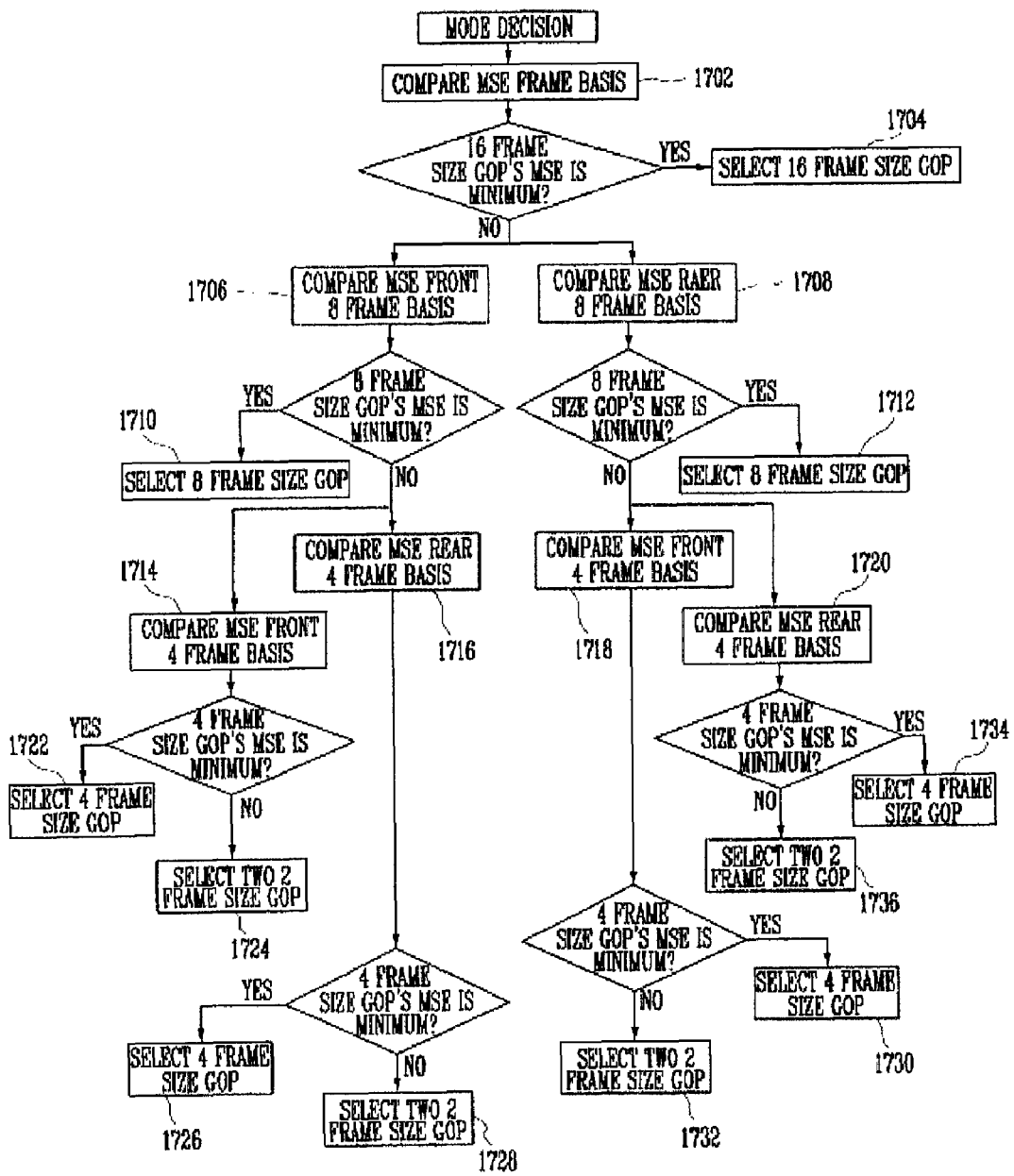

[Figure 18]
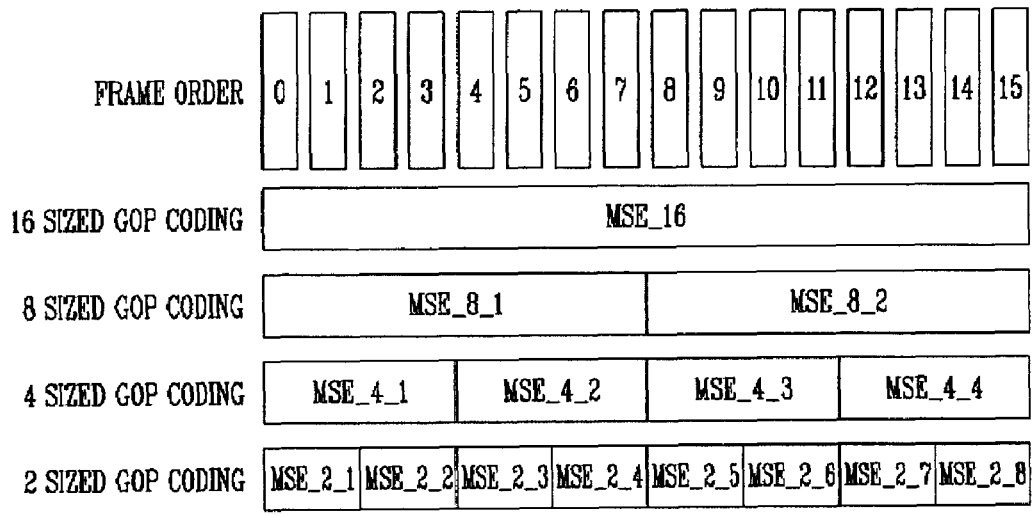
[Figure 19]
| GOP=16 | GOP=8 | | GOP=4 | | | GOP=2 | | | |
|---|---|---|---|---|---|---|---|---|---|
| 16 | 16 | 8 | 16 | 8 | 4 | 16 | 8 | 4 | 2 |
| 9.070 | 8.908 | 7.478 | 9.059 | 8.284 | 6.180 | 10.968 | 10.588 | 8.770 | 9.423 |
| | | | | | | | | | 8.118 |
| | | | | | 10.387 | | | 12.406 | 12.059 |
| | | | | | | | | | 12.753 |
| | | 10.337 | | 9.834 | 8.470 | | 11.348 | 12.067 | 11.808 |
| | | | | | | | | | 12.326 |
| | | | | | 11.198 | | | 10.628 | 11.424 |
| | | | | | | | | | 9.832 |

[Figure 20]
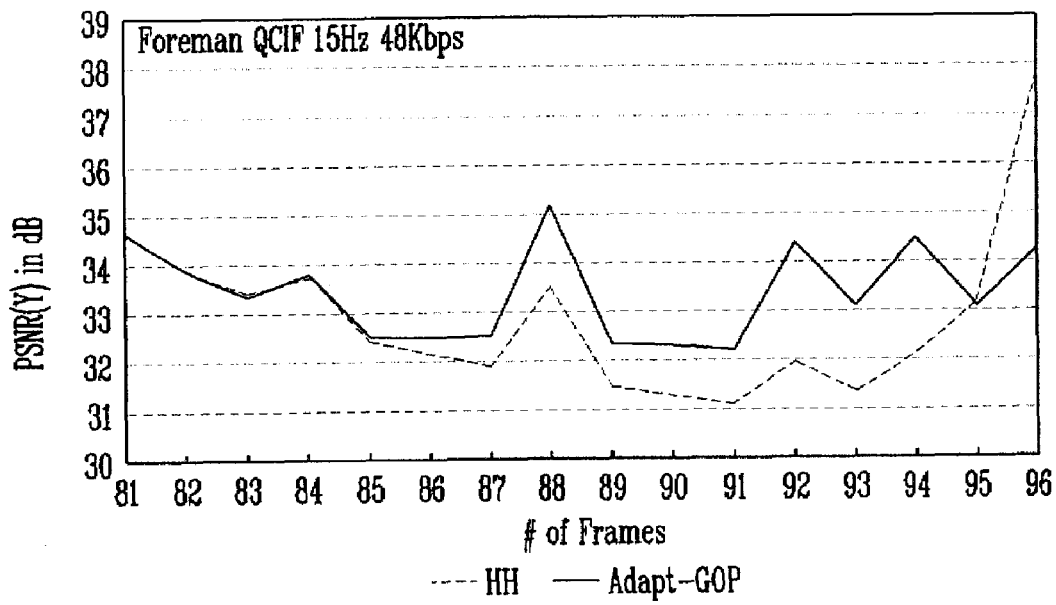
[Figure 21]
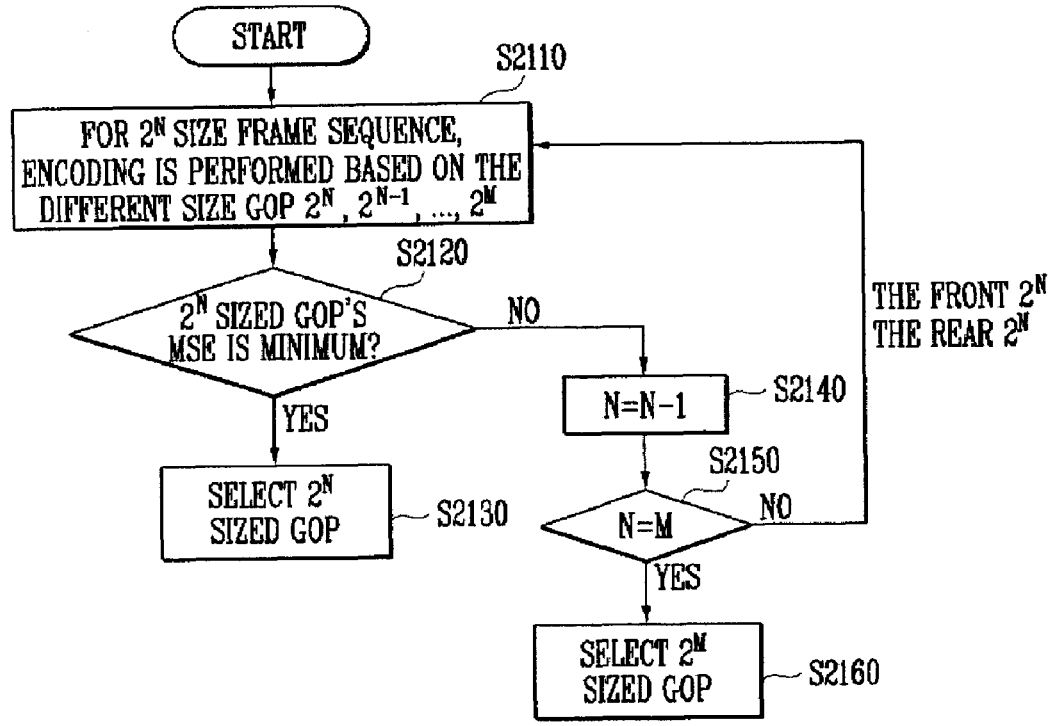

[Figure 22]
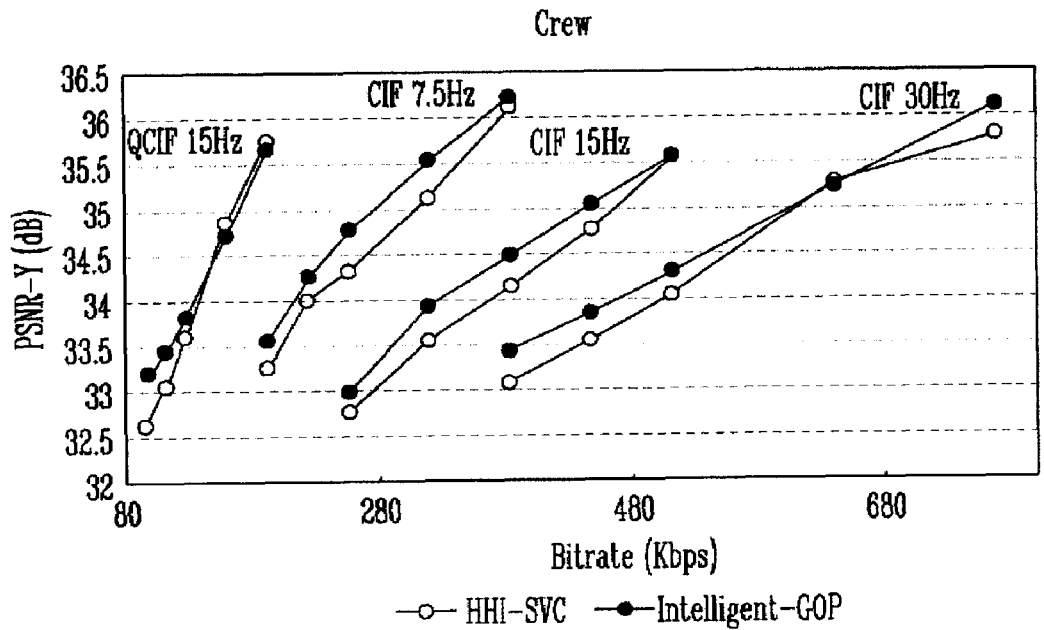
[Figure 23]
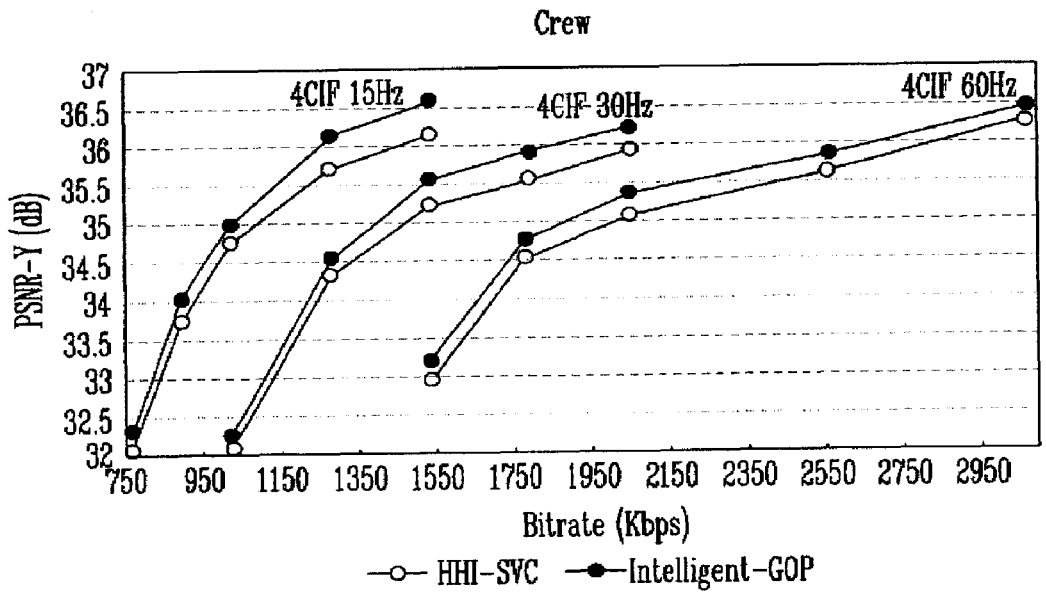

[Figure 24]

| GOP | PROPOSED GOP STRUCTURE | | | | | | | |
|---|---|---|---|---|---|---|---|---|
| 0 | 16 | | | | | | | |
| 1 | 8 | | | 4 | | 2 | 2 | |
| 2 | 4 | | 4 | | 4 | | 4 | |
| 3 | 4 | | 2 | 2 | 4 | | 4 | |
| 4 | 4 | | 4 | | 8 | | | |
| 5 | 4 | | 2 | 2 | 2 | 2 | 4 | |
| 6 | 4 | | 2 | 2 | 4 | | 4 | |
| 7 | 4 | | 2 | 2 | 2 | 2 | 2 | 2 |
| 8 | 2 | 2 | 4 | | 2 | 2 | 2 | 2 |
| 9 | 2 | 2 | 2 | | | | | |

[Figure 25]
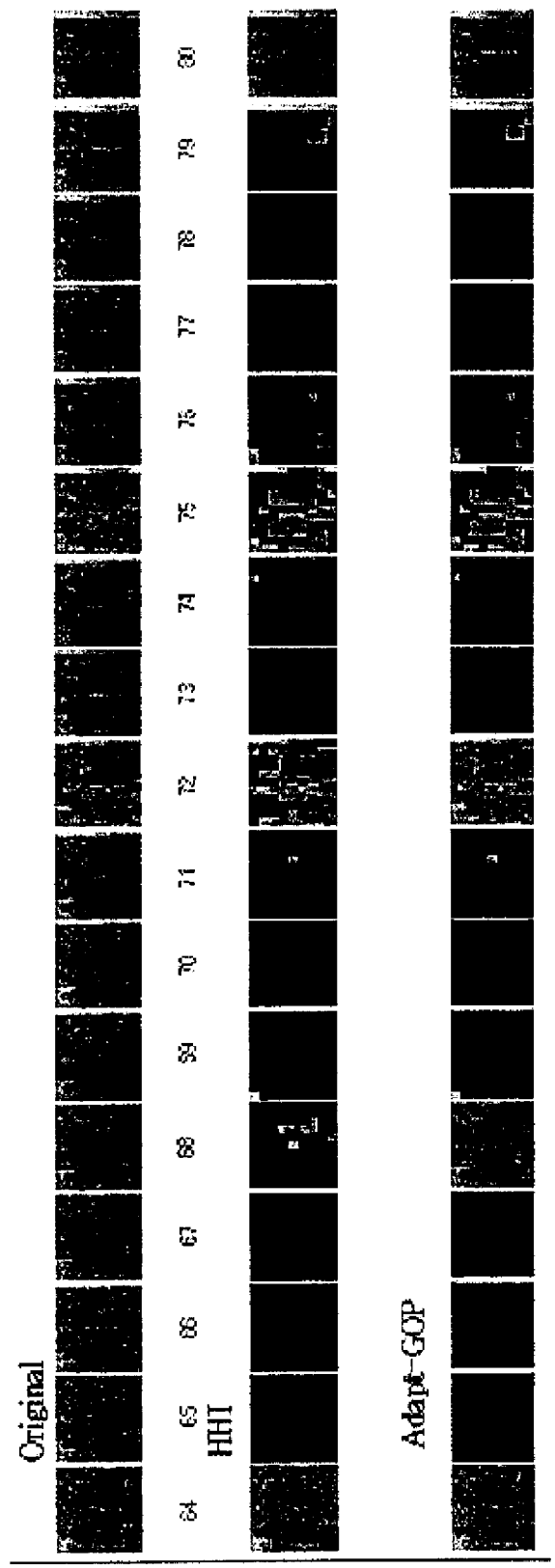

[Figure 26]
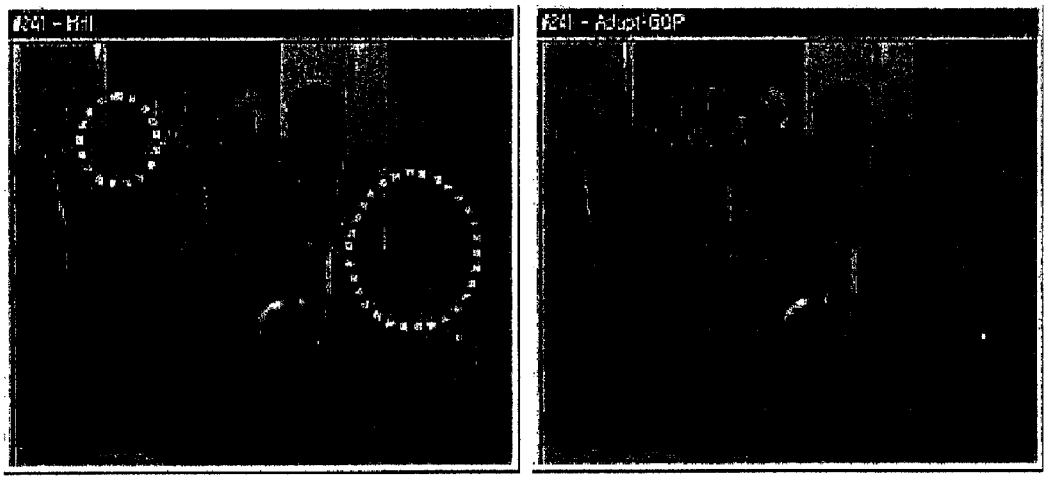
[Figure 27]
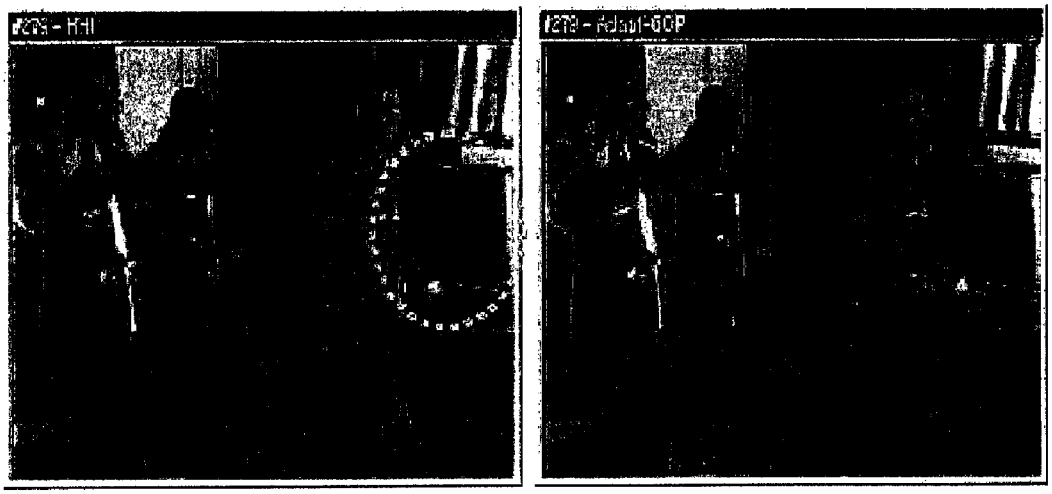

[Figure 28]
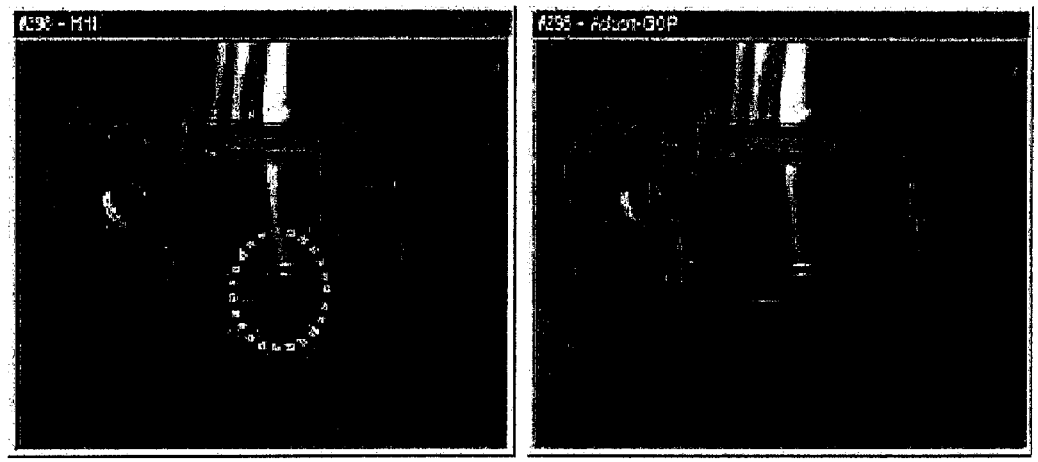
[Figure 29]
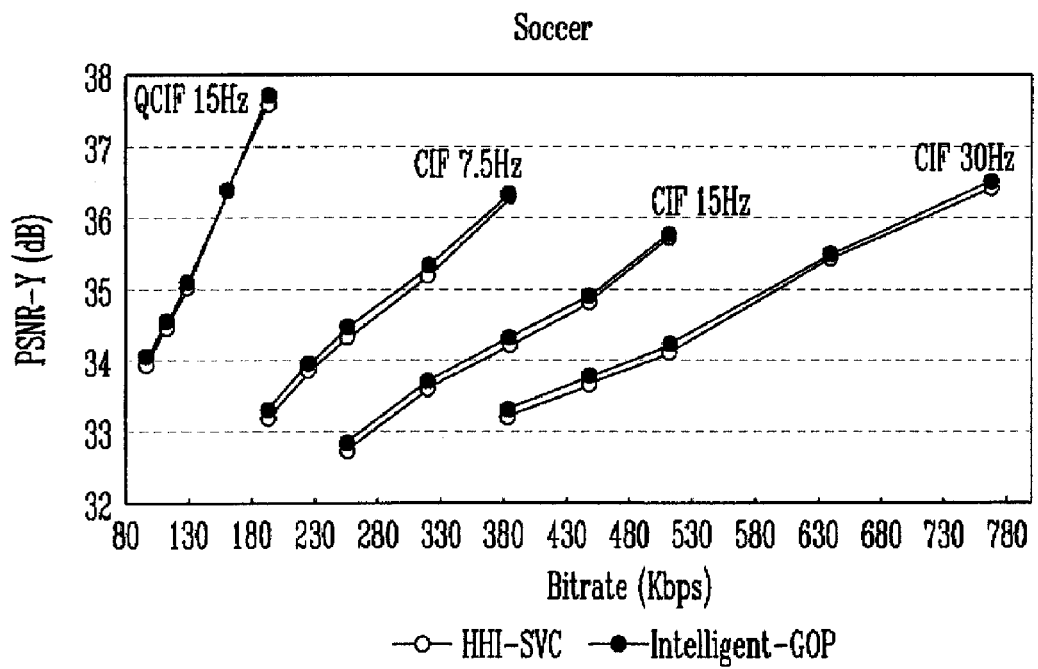

[Figure 30]
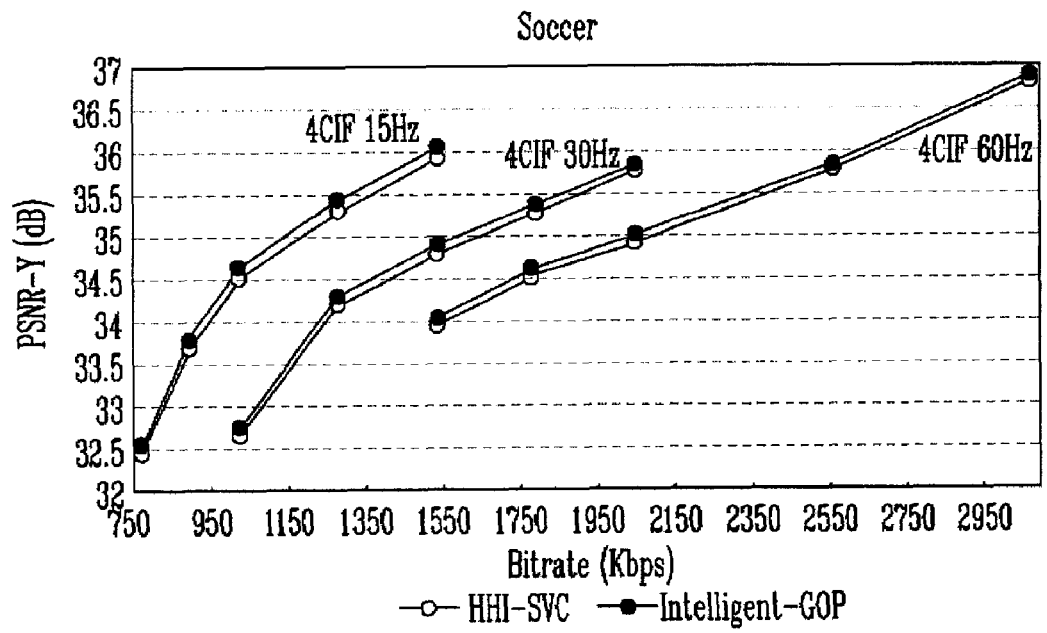
[Figure 31]
| GOP | PROPOSED GOP STRUCTURE | | |
|---|---|---|---|
| 0 | 16 | | |
| 1 | 16 | | |
| 2 | 16 | | |
| 3 | 8 | 4 | 4 |
| 4 | 8 | 4 | 4 |
| 5 | 16 | | |
| 6 | 16 | | |
| 7 | 8 | 8 | |
| 8 | 8 | 8 | |
| 9 | 8 | | |

[Figure 32]
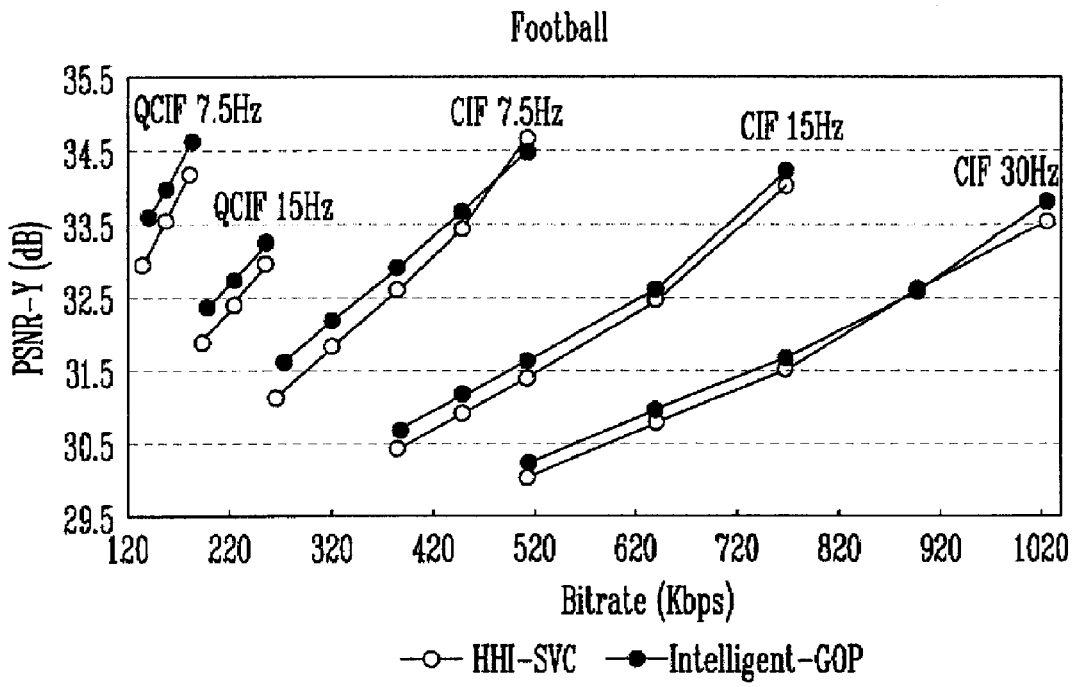
Football
[Figure 33]
| GOP | PROPOSED GOP STRUCTURE | | | | | | | |
|---|---|---|---|---|---|---|---|---|
| 0 | 8 | | | | 2 | 2 | 2 | 2 |
| 1 | 2 | 2 | 2 | 2 | 2 | 2 | 2 | 2 |
| 2 | 2 | 2 | 2 | 2 | 2 | 2 | 2 | 2 |
| 3 | 2 | 2 | 2 | 2 | 4 | | 4 | |
| 4 | 2 | 2 | 4 | | 8 | | | |
| 5 | 8 | | | | | | 2 | 2 |
| 6 | 2 | 2 | 2 | 2 | 2 | 2 | 4 | |
| 7 | 2 | | | | | | | |

[Figure 34]
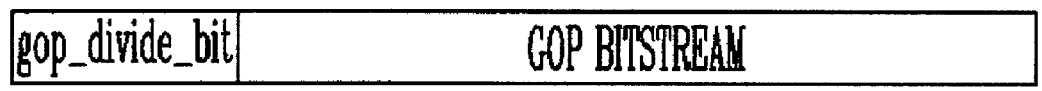
[Figure 35]
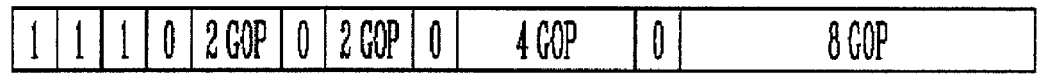
[Figure 36]
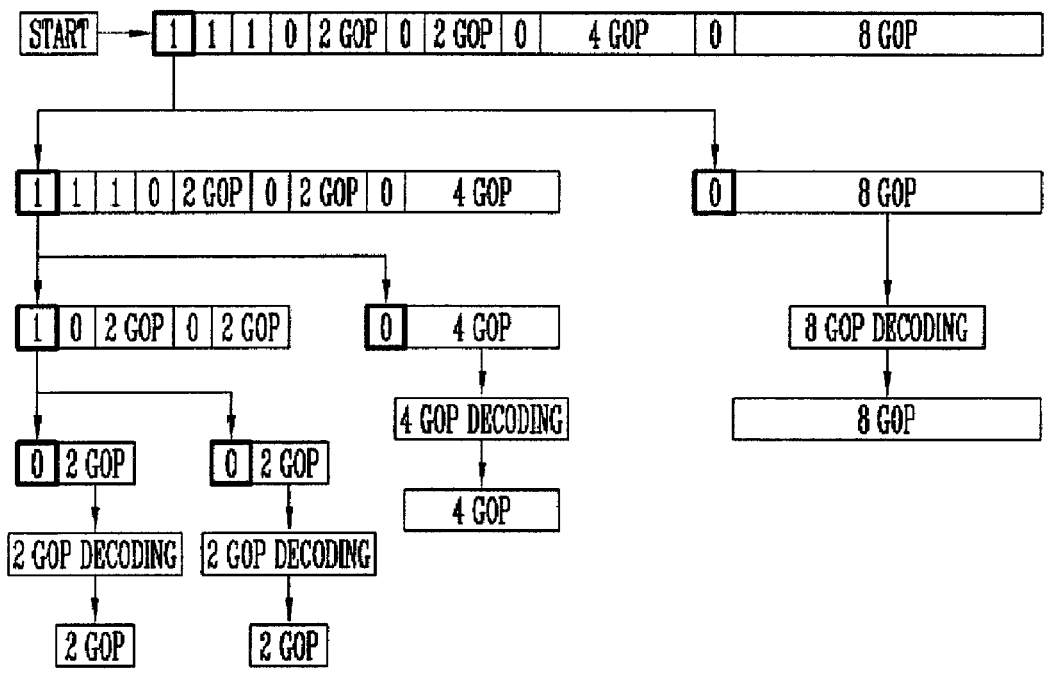

[Figure 37]
| 16 | | | | | | | |
|---|---|---|---|---|---|---|---|
| 8 | | | | 8 | | | |
| 8 | | | | 4 | | 4 | |
| 4 | | 4 | | 8 | | | |
| 4 | | 4 | | 4 | | 4 | |
| 2 | 2 | 4 | | 8 | | | |
| 4 | | 2 | 2 | 8 | | | |
| 2 | 2 | 2 | 2 | 8 | | | |
| 2 | 2 | 4 | | 4 | | 4 | |
| 2 | 2 | 2 | 2 | 4 | | 4 | |
| 2 | 2 | 2 | 2 | 2 | 2 | 2 | 2 |
[Figure 38]
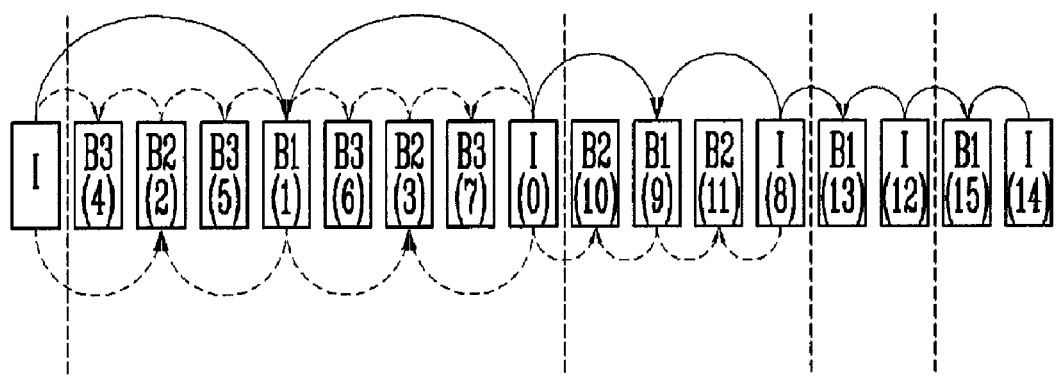

[Figure 39]
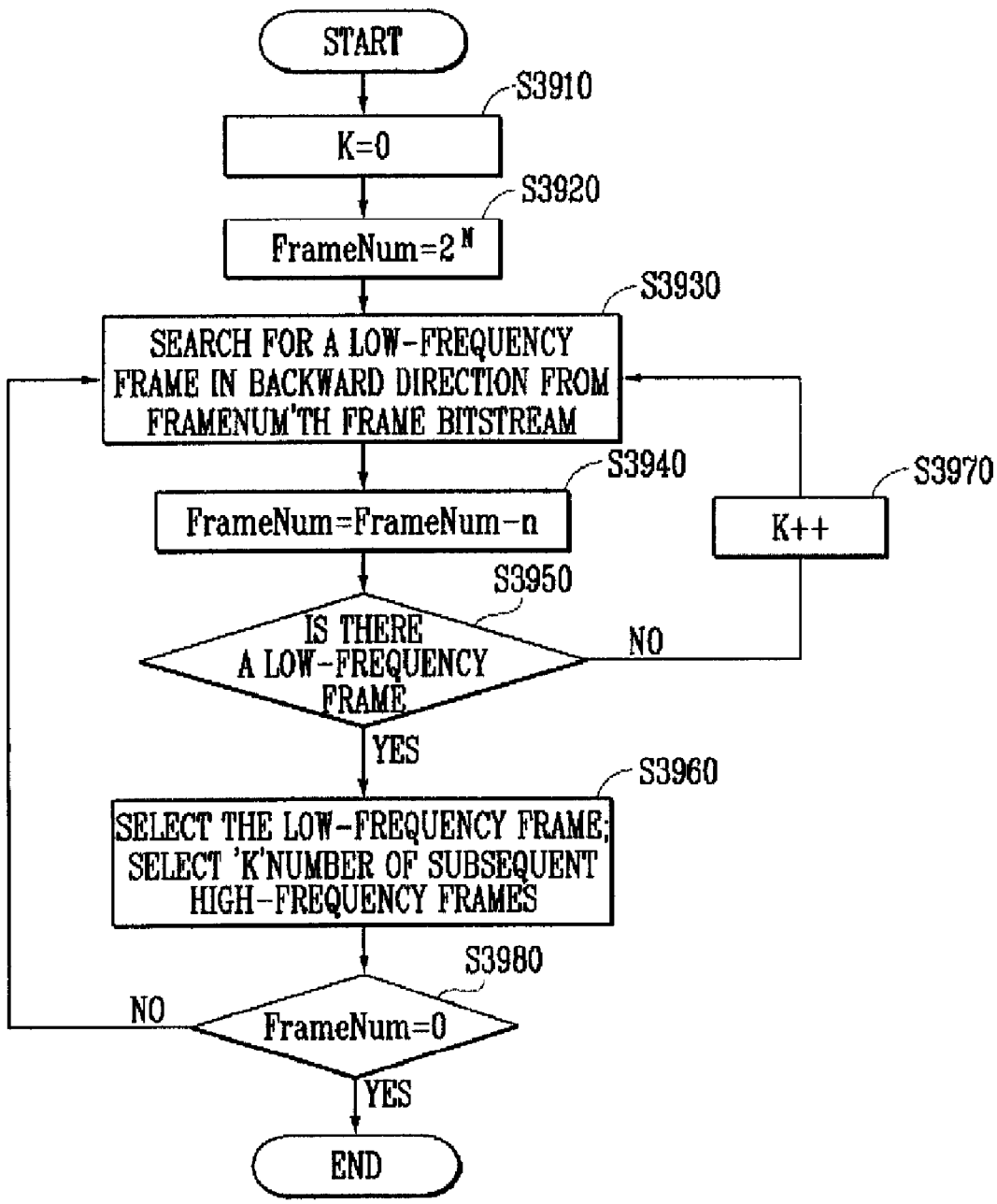

[Figure 40]

| scalability_information(payloadSize) { | C | Descriptor |
|---|---|---|
| max_mb_number_in_row | 5 | ue(v) |
| max_mb_number_in_column | 5 | ue(v) |
| frame_rate_unit_nominator | 5 | ue(v) |
| frame_rate_unit_denominator | 5 | ue(v) |
| max_decomposition_stages | 5 | ue(v) |
| num_spatial_layers | 5 | ue(v) |
| ave_base_layer_flag | 5 | u(1) |
| if(ave_base_layer_flag) { | | |
|     base_layer_decomposition_stages | 5 | ue(v) |
| } | | |
| use_adaptive_gop_structure_flag | 5 | u(1) |
| if(use_adaptive_gop_structure_flag) { | | |
|     sub_gop_level | 5 | ue(v) |
| } | | |
| non_dyadic_spatial_scalability_flag | 5 | u(1) |
| for(i=0;i <num_spatial_layers; i++) { | | |
|     if(extended_spatial_scalability_flag) { | | |
|         frame_width_in_mbs_minus1[ i ] | 5 | ue(v) |
|         frame_height_in_mbs_minus1[ i ] | 5 | ue(v) |
|     } | | |
|     else | | |
|         spatial_resolution factor[ i ] | 5 | ue(v) |
|         temporal_resolution factor[ i ] | 5 | ue(v) |
|     } | | |
| } | | |

# METHOD FOR ENCODING/DECODING A VIDEO SEQUENCE BASED ON HIERARCHICAL B-PICTURE USING ADAPTIVELY-ADJUSTED GOP STRUCTURE

TECHNICAL FIELD

The present invention relates to a video coding/decoding scheme, and more particularly, to a method for encoding a video sequence based on hierarchical B-picture using intelligently-divided group of pictures (GOP) and a method for decoding an encoded bitstream.

BACKGROUND ART

The video coding scheme using hierarchical B-picture is a coding scheme that performs hierarchical prediction using B-picture that predicts motion in both directions to add temporal scalability to the existing block-based video coding schemes used in existing international video standards, such as MPEG-1, MPEG-2, MPEG-4 Part 2 Visual, MPEG-4 Part 10 AVC (Advanced Video Coding), or ITU-T H.264, in the same manner as a motion compensated temporal filtering (MCTF) scheme. In this manner, an encoded bitstream can be decoded in the existing international standard video system.

The existing video coding technique based on the hierarchical B-picture performs encoding in units of a power of 2, each of which generally equals the size of a GOP. FIG. 1 shows an encoding concept of a video sequence where a GOP size is 8.

FIG. 2 shows a process of performing prediction using hierarchical B-picture structure in a GOP having a size of 16. First, a bidirectional prediction picture "B1" can be predicted from both intra pictures "I". Second bidirectional prediction pictures "B2" can be predicted using the pictures "B1" and "I". Third bidirectional prediction pictures "B3" can be predicted using the pictures "I" and "B2"; and "B1" and "B2". And fourth bidirectional prediction pictures "B4" can be obtained using the pictures "I" and "B3"; :B1" and "B3"; and "B2" and "B3". After this hierarchical prediction, a bitstream is generated using the existing international video standard. The temporal scalability function like hierarchical B-picture can be realized by adopting each of the pictures "I", "B1" and "I" as a base layer, and each of the pictures "B2", "B3" and "B4" as an enhancement layer.

In the process of constructing the hierarchical B-picture structure as in FIG. 2, when the picture "B1" or "B2" is predicted, there is a high possibility of low prediction efficiency, because a reference frame is temporally distant. The prediction efficiency is highly related to a degree of motion, which is one of characteristics of the video sequence.

FIG. 3 shows data obtained by dividing a part of "Foreman" QCIF (Quarter Common Intermediate Format) 15 Hz video sequence into a 8-sized GOPs and then performing hierarchical B-picture encoding on the divided sequence. It can be seen that the picture has little motion in the GOP, and the encoded data show that good prediction has been made. In this manner, the hierarchical B-picture structure-based encoding produces a good prediction result in a static video.

Meanwhile, FIG. 4 shows data obtained by dividing a part of "Football" QCIF 15 Hz video sequence into 8-sized GOPs and then performing hierarchical B-picture-based encoding on the divided sequence. It can be seen from the figure that image frames change dynamically in a GOP. Thus, it can be concluded that, in a dynamic video sequence, the prediction using hierarchical B-picture structure is not performed well and the more intra blocks are generated in "B1" image frame.

In other words, it can be shown that the coding efficiency depends on the degree of motion in a video.

FIG. 5 shows an example where too many intra blocks are included in a prediction frame due to the poor motion prediction when "Football" QCIF 15 Hz video sequence is encoded.

On the basis of the fact that, in a dynamic video sequence, the larger the GOP size, the lower the prediction efficiency of the prediction picture, experiments have been performed while varying the GOP size. FIGS. 6 and 7 show graphs of coding efficiency results with 4 different GOP sizes (1, 2, 4 and 8) for "Football" sequence at QCIF 7.5 Hz and 15 Hz sequences, respectively. As shown, the smaller the GOP size, the higher the coding efficiency.

FIGS. 8 to 10 show the hierarchical B-picture construction process with three different GOP sizes 8, 4 and 2, respectively, for $16^{th}$ to $24^{th}$ frames of "Football" QCIF 15 Hz sequence. As a result, it can be seen that, when the GOP size is decreased, the intra frame is increased in one GOP, but the coding efficiency is further improved. Thus, it can be predicted that, in the dynamic video sequence, the smaller the GOP size, the higher the coding efficiency.

In contrast, with regard to the static "Forman" QCIF 15 Hz video sequence, the graphs representing the coding results with different GOP sizes 8, 4, 2 and 1 are shown in FIG. 11. As shown, in the static video sequence, the larger the GOP size, the higher the coding efficiency.

FIG. 12 shows the frame-based PSNR (Peak Signal-to-Noise Ratio) results of hierarchical B-picture-based coding for frames from $17^{th}$ to $24^{th}$ of "Football" sequence at QCIF 15 Hz at the same bit rate, based on three different GOP size, such as 8, 4 and 2. As shown in this figure, the 2-sized GOP has the best coding efficiency.

FIG. 13 shows the frame-based PSNR results of hierarchical B-picture-based coding for frames from $137^{th}$ to $144^{th}$ of "Foreman" sequence at QCIF 15 Hz at the same bit rate, based on three different GOP size, such as 8, 4 and 2. As shown in this figure, the 8-sized GOP shows the best coding efficiency.

Although the foregoing descriptions explains the relationship between the GOP size and coding efficiency, by giving examples of a dynamic video sequence with a lot of motion variations and a static video sequence having little motion variations, it is general for one video sequence to include various degrees of motion variations. For example, there are the various degrees of motion variations in "Foreman" video sequence, as can be seen in FIG. 14 shows the frame-based PSNR results of hierarchical B picture-based coding for frames from $97^{th}$ to $104^{th}$ of "Foreman" sequence at QCIF 15 Hz at the same bit rate, based on three different GOP size, such as 8, 4 and 2. It can be seen from the figure that the 8-sized GOP has higher coding efficiency than the 4 or 2-sized GOP, which is the opposite to the overall result of "Foreman" video sequence. The 4 or 2-sized GOP may have slightly improved the overall coding efficiency. It can be expected that front four frames have the best coding efficiency when the GOP size is 2, while the rear four frames have the best coding efficiency when the GOP size is 4.

In view of the PSNR results for $97^{th}$ to $112^{th}$ frames for "Foreman" QCIF 15 Hz sequence of FIG. 15, it is possible to obtain the optimal coding efficiency when, as shown in FIG. 14, the first four frames are encoded with 2-sized GOP, the next four frames are encoded with 4-sized GOP s and the remaining eight frames are encoded with 8-sized GOP.

Accordingly, when performing the hierarchical B picture-based coding of a video sequence, it is possible to achieve a high coding efficiency by intelligently selecting the GOP size.

DISCLOSURE

Technical Problem

Accordingly, it is an object of the present invention to provide a method of adaptively dividing the size of a GOP based on the coding efficiency when encoding a video using a hierarchical B-picture.

It is another object of the present invention to provide a method of performing hierarchical B picture-based encoding a video sequence by adaptively dividing a $2^N$ frame-sized GOP.

It is yet another object of the present invention to provide a method for decoding an encoded video bitstream, which has been encoded based on the adaptive GOP structure.

It is yet another object of the present invention to provide a method of decoding an encoded video bitstream based on an adaptive GOP structure, which can support temporal scalability.

Technical Solution

In order to accomplish these objectives, according to an aspect of the present invention, there is provided a method for performing hierarchical B picture-based encoding on a video sequence. The method comprises the steps of: for each pre-defined $2^N$ frame-sized group of pictures (GOP) of the video sequence, (a) encoding the $2^N$ frame-sized GOP of the video sequence based on each of the different GOP sizes from the maximum size, $2^N$, to the minimum size, $2^M$ (M is an integer between 1 and N) and obtaining different values between frames reconstructed after the encoding is performed and frames after the hierarchical B picture prediction is performed, based on each of the different GOP sizes; (b) selecting at least one sub-GOP based on the difference values obtained by encoding the $2^N$ frame-sized GOP of the video sequence based on each of the different GOP sizes; and (c) generating a bitstream by encoding the $2^N$-frame-sized GOP based on the at least one selected sub-GOP.

In one embodiment, the step (b) includes the sub-steps of (b1) comparing the difference values obtained from the encoding based on each of the different GOP sizes from $2^N$ to $2^M$ and, if the difference value obtained from the encoding based on the $2^N$-sized GOP unit is the smallest, selecting the $2^N$-sized GOP as a sub-GOP; and (b2) if the difference value obtained from the encoding based on the $2^N$-sized GOP is not the smallest, after decreasing N by 1 (i.e., N=N−1), i) selecting two $2^M$-sized GOPs as the sub-GOPs if N has the same value as M, and ii) repeating steps (b1) and (b2) for each of the front $2^N$ frames and the rear $2^N$ frames, if N does not have the same value as M.

In one embodiment, the difference value may be selected from a group of MSE (Mean Square Error), SAD (Sum of Absolute Differences), SSE (Sum of Squared Errors), SAD+$\lambda_{SAD}R$ (R is the number of bits of the GOP unit), and SSE+$\lambda_{SSE}R$.

In another embodiment, the step b) includes the sub-steps of: (b1) comparing the difference values obtained from the encoding based on each of the different GOP sizes from $2^N$ to $2^M$ and, if the difference value obtained from the encoding based on the $2^N$-sized GOP unit is the smallest, selecting the $2^N$-sized GOP as a sub-GOP and setting a GOP divide bit inserted before the GOP bitstream as "0"; (b2) if the difference value obtained from the encoding based on the $2^N$-sized GOP is not the smallest, setting the GOP divide bit inserted before the GOP bitstream as "1" and, after decreasing N by 1 (i.e., N=N−1), i) selecting two $2^M$-sized GOPs as the sub-GOPs if N has the same value as M, and ii) repeating steps (b1) and (b2) for each of the front $2^N$ frames and the rear $2^N$ frames, if N does not have the same value as M.

In another embodiment, the at least one selected sub-GOP information is set in the first frame header information of the GOP to transmit to a decoder.

According to another aspect of the present invention, there is provided a method for performing hierarchical B picture-based coding on a video sequence. The method comprises the steps of: (a) for each predetermined $2^N$-frame-sized GOP of the video sequence, (a1) encoding the $2^N$ frame-sized GOP of the video sequence based on each of the different GOP sizes from the maximum size, $2^N$, to the minimum size, $2^M$ (M is an integer between 1 and N) and selecting at least one sub-GOP based on the encoding result, and (a2) generating a bitstream by encoding the $2^N$-frame-sized GOP based on the at least one selected sub-GOP; and (b) inserting temporal scalability range information in the generated bitstream.

In one embodiment, the range of temporal scalability is based on a minimum size ($2^M$) of the selected sub-GOP.

According to yet another aspect of the present invention, there is provided a method for decoding a hierarchical B picture-based encoded bitstream. The method comprises the steps of (a) reading and checking a value of a bit indicating whether the GOP is divided; (b) when the bit value is "0", decoding the GOP bitstream; (c) when the bit value is "1", dividing the GOP bitstream into a front half-sized GOP bitstream and a rear half-sized GOP bitstream; and (d) repeating the steps (a) through (d) for each of the front GOP bitstream and the rear GOP bitstream, respectively.

According to yet another aspect of the present invention, there is provided a method for decoding a hierarchical B picture-based encoded bitstream. The method comprises the steps of: for each predetermined $2^N$-sized GOP bitstream, (a) determining whether the GOP is divided; (b) when the GOP is determined not to be divided, decoding the GOP bitstream; (c) when the GOP is determined to be divided, dividing the GOP bitstream; and (d) decoding the divided GOP bitstreams.

According to yet another aspect of the present invention, there is provided a method for decoding a hierarchical B picture-based encoded bitstream. The method comprises the steps of: for each predetermined $2^N$-sized GOP bitstream, reading adaptively-divided GOP structure information from the GOP bitstream; and decoding the GOP bitstream based on the adaptively-divided GOP structure information.

According to yet another aspect of the present invention, there is provided a method for decoding a hierarchical B picture-based encoded bitstream. The method comprises the steps of: for a predetermined-sized GOP bitstream, reading variable GOP structure information from the GOP bitstream; and decoding the GOP bitstream based on the variable GOP structure information.

According to yet another aspect of the present invention, there is provided a method for providing 1/L temporal scalability upon decoding an hierarchical B picture-based encoded bitstream, the method comprises the steps of: for each predetermined $2^N$-frame-sized GOP bitstream, (a) initializing "k" to 0 (k is an integer); (b) initializing "FrameNum" to $2^N$; (c) detecting whether there is a low-frequency frame in a bitstream from FrameNum$^{th}$ frame to L$^{th}$ frame in the reverse direction, and decreasing FrameNum by L; (d) based on the result of detecting in step (c), (d−1) increasing the value of k by 1, if there is no low-frequency frame, and (d−2) selecting the low-frequency frame detected first in the reverse direction if there is a low-frequency picture and, if the value of k is not 0, further selecting subsequent k number of high-frequency frames and then re-initializing k to 0; and (e) repeating steps (c) and (d) until FramNum reaches 0, and finally selecting $2^N/L$ number of frames.

Advantageous Effects

According to the present invention, the hierarchical B picture-based video coding is performed by adaptively dividing the GOP size based on the performance and thereby obtaining high coding efficiency.

DESCRIPTION OF DRAWINGS

FIG. 1 shows an encoding concept of a video sequence where a GOP size is 8;

FIG. 2 shows a process of performing hierarchical B-picture prediction in a GOP having a size of 16;

FIG. 3 shows a part of "Foreman" QCIF 15 Hz video sequence;

FIG. 4 shows a part of "Football" QCIF 15 Hz video sequence;

FIG. 5 shows an example where too many intra blocks are included in a bidirectional prediction frame;

FIG. 6 is a graph of the coding result for "Football" sequence at QCIF 7.5 Hz while varying GOP sizes;

FIG. 7 is a graph of the coding result for "Football" sequence at QCIF 15 Hz while varying GOP sizes;

FIG. 8 shows a hierarchical B picture construction process of $16^{th}$ to $24^{th}$ frames for "Football" sequence at QCIF 15 Hz (GOP=8);

FIG. 9 shows a hierarchical B picture construction process of $16^{th}$ to $24^{th}$ frames for "Football" sequence at QCIF 15 Hz (GOP=4);

FIG. 10 shows a hierarchical B-picture construction process of $16^{th}$ to $24^{th}$ frames for "Football" sequence at QCIF 15 Hz (GOP=2);

FIG. 11 shows the graph of the coding results with different GOP sizes, for "Foreman" sequence at QCIF 15 Hz;

FIG. 12 shows the frame-based PSNR results for frames from $17^{th}$ to $24^{th}$ of "Football" sequence at QCIF 15 Hz;

FIG. 13 shows the frame-based PSNR results for frames from $137^{th}$ to $144^{th}$ of "Foreman" sequence at QCIF 15 Hz;

FIG. 14 shows the frame-based PSNR results for frames from $97^{th}$ to $104^{th}$ of "Foreman" sequence at QCIF 15 Hz;

FIG. 15 shows the frame-based PSNR results and the targeted performance values for $97^{th}$ to $112^{th}$ frames of "Foreman" QCIF 15 Hz sequence;

FIG. 16 shows a flowchart of an algorithm of adaptive GOP structure-based video coding according to one embodiment of the present invention;

FIG. 17 shows the detailed mode decision process shown in FIG. 16;

FIG. 18 shows the conceptual locations where the MSE value of each GOP is taken within the 16 frame-sized GOP;

FIG. 19 conceptually shows the process of adaptively dividing the 16 frame-sized GOP based on the MSE values in accordance with one embodiment of the present invention;

FIG. 20 shows a graph of frame-based PSNR results when encoding is performed on the basis of the adaptively-divided GOP structure shown in FIG. 19;

FIG. 21 shows a flowchart showing a mode decision process according to one embodiment of the present invention;

FIG. 22 shows a graph comparing results of the HHI codec-based encoding and the adaptive GOP structure-based encoding according to the present invention with respect to "Crew" video sequence (QCIF and CIF);

FIG. 23 is a graph comparing results of the HHI codec-based encoding and the adaptive GOP structure-based encoding according to the present invention for "Crew" video sequence at 4CIF;

FIG. 24 shows the GOP structure for "Crew" QCIF 15 Hz video sequence, wherein the GOP structure is adaptively divided in accordance with the present invention;

FIG. 25 shows the results of the hierarchical B-picture construction based the adaptive GOP structure according to the present invention and based on HHI codec for $64^{th}$ to $80^{th}$ frames of "Crew" video sequence.

FIG. 26 shows frames obtained by the HHI codec-based encoding and the adaptive GOP structure-based encoding of the present invention with respect to "Crew" video sequence ($241^{st}$ frame);

FIG. 27 shows frames obtained by the HHI codec-based encoding and the adaptive GOP structure-based encoding of the present invention with respect to "Crew" video sequence ($279^{th}$ frame);

FIG. 28 shows frames obtained by the HHI codec-based encoding and the adaptive GOP structure-based encoding of the present invention with respect to "Crew" video sequence ($298^{th}$ frame);

FIG. 29 shows a graph comparing results of the HHI codec-based encoding and the adaptive GOP structure-based encoding of the present invention for "Football" sequence at QCIF and CIF;

FIG. 30 shows a graph comparing results of the HHI codec-based encoding and the adaptive GOP structure-based encoding of the present invention for "Football" sequence at 4CIF;

FIG. 31 shows the GOP structure for "Football" QCIF 15 Hz video sequence wherein the GOP structure is adaptively divided in accordance with the present invention;

FIG. 32 shows a graph comparing results of the HHI codec-based encoding and the adaptive GOP structure-based encoding of the present invention for "Football" sequence at QCIF and CIF;

FIG. 33 shows the GOP structure for "Football" QCIF 15 Hz video sequence wherein the GOP structure is adaptively divided in accordance with the present invention;

FIG. 34 shows a configuration of a GOP bitstream to which "gop_divide_bit" is added in accordance with one embodiment of the present invention;

FIG. 35 shows an example of a bitstream where the 16 frame-sized GOP is divided and encoded into sub-GOPs of (2, 2, 4, 8) according to the present invention, FIG. 36 shows a process of decoding the bitstream shown in FIG. 35 in accordance with one embodiment of the present invention;

FIG. 37 shows an example of a GOP structure where the 16 frame-sized GOP is adaptively divided in accordance with the present invention;

FIG. 38 shows a process where the 16 frame-sized GOP is divided and encoded into sub-GOPs of (8, 4, 2, 2) according to the present invention; and FIG. 39 shows a flowchart of a 1/L resolution-supported algorithm performed at a bitstream extractor in a decoder to provide temporal scalability in accordance with one embodiment of the present invention.

FIG. 40 shows the modified syntax of scalability information, SEI message of Joint Scalable Video Model (JSVM) 2.0, according to one embodiment of the present invention.

MODE FOR INVENTION

Hereinafter, the present invention will be described in detail with reference to FIGS. 16 to 40. However, the following description is provided for illustrative purposes only and should not be construed as limiting the scope of the present invention.

FIG. 16 is a flowchart of a method of encoding a video sequence based on the adaptive GOP structure according to one embodiment of the present invention. Assuming that encoding is carried out based on a GOP having $2^N$ frame size, and that a selectable minimum GOP size is $2^M$ (N and M are integers, 0<M<N), the method of encoding a video sequence based on the adaptive GOP structure is performed as follows.

(1) For one GOP of the video frame sequence, encoding is performed on the basis of each different GOP sizes, from the maximum $2^N$-sized GOP to the minimum $2^M$-sized GOP and, for each of the different GOP sizes, MSE (Mean Square Error) between each frame reconstructed per sub-band after the hierarchical B-picture prediction is performed and each frame reconstructed per sub-band after the encoding is performed are obtained (S1610, S1620 and S1630). MSE is just an example and not limited thereto and any one of SAD (Sum of Absolute Differences), SSE (Sum of Squared Errors), SAD+$\lambda_{SAD}$R (R: the bit number of one GOP), SSE+$\lambda_{SSE}$R may be used as the reference. This will be described below.

(2) At least one sub-GOP is selected to divide the $2^N$-sized GOP on the basis of MSE of each GOP size obtained in process (1) (S1640). In this specification, a process of dividing the $2^N$-sized GOP by selecting the sub-GOPs that produce minimum MSE in the GOP is referred to as a "mode decision" procedure.

(3) The video sequence having a $2^N$ frame size is encoded on the basis of the selected sub-GOP structure to generate a bitstream thereof (S1650).

(4) Processes (1) to (3) are repeated for the next GOP of the video frame sequence.

In the above embodiment, in the mode decision procedure, the MSE of each frame can be calculated by the following equation.

$$MSE(k) = \frac{1}{k}\sum_{i=0}^{k} [F(i) - G(i)]^2 \quad \text{Equation 1}$$

In the above Equation, k indicates the number of pixels of one frame, F(i) is the pixel value of per-subband frame generated after the hierarchical B-picture prediction is performed and G(i) is the pixel value of per-subband frame reconstructed after the encoding is performed.

FIG. 17 shows the detailed mode decision process shown in FIG. 16, where the GOP size is 16 (or N is 4) and the minimum selectable GOP size is 2 (or M is 1). As shown, when the GOP size is 16 frames, adaptive division of the GOP is as follows:

(1) With regard to 16 frames, encoding is performed based on the various sub-GOP sizes of 16(N=4), 8(N=3), 4(N=2) and 2(N=M=1), respectively, and the MSE values of sub-GOPs are calculated based on the encoding results and then compared with each other (S1702).

Based on the comparison results:

A. When the MSE obtained from the encoding results of 16 frame-sized GOP is the smallest, the 16-frame GOP is selected, and the mode decision process is terminated (1704).

B. When the MSE obtained from the encoding results of a 16-frame GOP is not the smallest, the front 8 frames are subjected to the following process (2) (1706), and the rear 8 frames are subjected to the following process (3) (1708).

(2) The front 8 frames are encoded based on the different GOP sizes and each of the MSE values of the encoding results are compared with each other:

A. When the MSE obtained from the encoding result of the 8 frame-sized GOP is the smallest, the 8 frame-sized GOP is selected (1710).

B. When the MSE obtained from the encoding result of the 8-frame GOP is not the smallest, the front 4 frames are subjected to the following process (4) (1714), and the rear 4 frames are subjected to the following process (5) (1716).

(3) The rear 8 frames are encoded based on the different GOP sizes and each of the MSE values of the encoding results are compared with each other:

A. When the MSE obtained from the encoding result of the 8 frame-sized GOP is the smallest, the 8 frame-sized GOP is selected, and the mode decision process is terminated (1712).

B. When the MSE obtained from the encoding result of the 8 frame-sized GOP is not the smallest, the front 4 frames are subjected to the following process (6) (1718), and the rear 4 frames are subjected to the following process (7) (1720).

(4) The front 4 frames are encoded based on the different GOP sizes and each of the MSE values of the encoding results are compared with each other:

A. When the MSE obtained from the encoding result of 4-sized GOP is the smallest, the 4 frame-sized GOP is selected (1722).

B. When the MSE obtained from the encoding result of the 4-sized GOP is not the smallest, two 2-sized GOPs are selected (1724).

(5) The rear 4 frames are encoded based on the different GOP sizes and each of the MSE values of the encoding results are compared with each other:

A. When the MSE obtained from the encoding result of 4-sized GOP is the smallest, the 4-sized GOP is selected (1726).

B. When the MSE obtained from the encoding result of the 4-sized GOP is not the smallest, two 2-sized GOPs are selected (1728).

(6) The front 4 frames are encoded based on the different GOP sizes and each of the MSE values of the encoding results are compared with each other:

A. When the MSE obtained from the encoding result of 4-sized GOP is the smallest, the 4 frame-sized GOP is selected (1730).

B. When the MSE obtained from the encoding result of the 4-sized GOP is not the smallest, two 2-sized GOPs are selected (1732).

(7) The rear 4 frames are encoded based on the different GOP sizes and each of the MSE values of the encoding results are compared with each other:

A. When the obtained from the encoding result of 4-sized GOP is the smallest, the 4 frame-sized GOP is selected and the mode decision process is terminated (1734).

B. When the MSE obtained from the encoding result of the 4-sized GOP is not the smallest, two 2-frame GOPs are selected, and the process is terminated (1736).

The foregoing algorithm of FIG. 17 is represented in Pseudo Code as follows:

```
gop_mode=min MSE_16, (MSE_8_1 + MSE_8_2)/2,
(MSE_4_1 + MSE_4_2 + MSE_4_3 +
MSE_4_4)/4,
    (MSE_2_1 + MSE_2_2 + (MSE_2_3 +
    MSE_2_4 + MSE_2_5 + MSE_2_6 +
    MSE_2_7 +
```

-continued

```
       MSE_2_8)/8 )
       If(gop_mode==MSE_16)
       Select 16-sized GOP
       End of mode Decision
     Else
       gop_mode=min MSE_8_1, (MSE_4_1 + MSE_4_2)/2,
       (MSE_2_1 + MSE_2_2 + MSE_2_3 +
       MSE_2_4)/4
         If(gop_mode==MSE_8_1)
       Select 8-sized GOP
       Else
       gop_mode=min MSE_4_1, (MSE_2_1 +
       MSE_2_2)/2
       If(gop_mode==MSE_4_1)
       Select 4-sized GOP
             Else
             Select 2-sized GOP
             Select 2-sized GOP
       gop_mode=min MSE_4_2, (MSE_2_3 +
       MSE_2_4)/2
       If(gop_mode==MSE_4_2)
       Select 4-sized GOP
       Else
             Select 2-sized GOP
             Select 2-sized GOP
       gop_mode=min MSE_8_2, (MSE_4_3 +
       MSE_4_4)/2, (MSE_2_5 + MSE_2_6 +
       MSE_2_7 +
       MSE_2_8)/4
             If(gop_mode==MSE_8_1)
             Select 8-sized GOP
             End of mode Decision
       Else
       gop_mode=min MSE_4_3, (MSE_2_5 +
       MSE_2_6)/2
       If(gop_mode==MSE_4_3)
       Select 4-sized GOP
       Else
       Select 2-sized GOP
       Select 2-sized COP
       Else
       gop_mode=min MSE_4_4, (MSE_2_7 +
       MSE_2_8)/2
       If(gop_mode==MSE_4_4)
       Select 4-sized GOP
       End of mode Decision
       Else
       Select 2-sized GOP
       Select 2-sized GOP
       End of mode Decision
```

FIG. 18 shows the conceptual locations where the MSE of each sub-GOP is taken within the 16 frame-sized GOP.

FIG. 19 shows the MSE values calculated from the encoding results based on the GOP sizes of 16, 8, 4, and 2, respectively, in the process of adaptively dividing a GOP including $81^{st}$ to $96^{th}$ frames of "Foreman" QCIF 15 Hz sequence, as an example of 16 frame-sized video sequence, in accordance with the present invention, in which the selected sub-GOP sizes are marked with shading. The sub-GOP sizes are determined through the following processes:

(1) First, in comparison of the MSE values obtained from the 16 frame encoding, since the MSE value of 16 frame-sized GOP is not the smallest, the comparison of the MSE values for the front 8 frames and the rear 8 frames, respectively, is performed.

(2) In comparison of the MSE values obtained from the front 8 frame encoding, since the MSE value of 8 frame-sized GOP is the smallest, the 8 frame-sized GOP is selected.

(3) In comparison of the MSE values obtained from the rear 8 frame encoding, since the MSE value of 8 frame-sized GOP is not the smallest, the comparison of the MSE values for the front 4 frames and the rear 4 frames, respectively, is performed.

(4) In comparison of the MSE values obtained from the front 4 frame encoding, since the MSE value of 4 frame-sized GOP is the smallest, the 4 frame-sized GOP is selected.

(5) In comparison of the MSE values obtained from the rear 4 frame encoding, since the MSE value of 4 frame-sized GOP is not the smallest, two 2-frame GOPs are selected, and the process is terminated.

FIG. 20 is a graph of frame-based PSNR results when encoding is performed on the basis of an adaptively divided GOP structure in accordance with FIG. 19.

Here, the dotted line denotes the PSNR (picture quality) according to SVM (Scalable Video Model) 3.0 proposed by HHI for SVC (Scalable Video Coding), which is currently undergoing international standardization. And, the solid line denotes the PSNR when the intelligent GOP selection proposed in the present invention is applied to the SVM 3.0. It can be concluded through PSNR comparison that performance is improved.

FIG. 21 is a flowchart showing a mode decision process according to one embodiment of the present invention. As shown, difference values obtained from encoding based on the different GOP sizes from the maximum $2^N$-sized GOP to the minimum $2^M$-sized GOP, with respect to a $2^N$-frame video sequence, are compared with each other (S2110). As a result of the comparison, it is determined if the difference value obtained by the $2^N$-sized GOP-based encoding is the smallest (S2120). If so, the $2^N$-sized GOP is selected (S2130).

Otherwise, N is decreased by 1 (S2140). The decreased N is compared with M (S2150). As a result of the comparison, if the two values are identical, two $2^M$-sized GOPs are selected (S2160).

If the decreased N is not identical to M, the front $2^N$-sized sequence and the rear $2^N$-sized sequence are subjected to repetition of the foregoing processes S2110 to S2160.

In the above embodiment, the MSE is used in the comparison of the mode decision process. Alternatively, SAD (Sum of Absolute Difference) or SSE (Sum of Squared Error) between the image frames of the input sequence and the image frames reconstructed after the encoding may be used. They may be used in case that the calculation complexity of the mode decision is a lot considered.

In another embodiment, in the mode decision process, Lagrangian optimization scheme used in the AVC (Advanced Video Coding), the basic international video standard, may be used. This scheme is to use a value represented by the sum of the product of the number of bits and a Lagrangian coefficient, together with the SAD or SSE. The Lagrangian coefficient is defined based on a quantization coefficient (Qp) value as follows:

$$\lambda_{SAD}=0.92 \times 2^{Qp/6-2}$$

$$\lambda_{SSE}=0.85 \times 2^{Qp/3-4} \quad \text{Equation 2}$$

The comparison value, J, can be obtained by the following equations:

In the case of using the SAD, $$J=SAD+\lambda_{SAD}R \quad \text{Equation 3}$$

In the case of using the SSE, $$J=SSE+\lambda_{SSE}R \quad \text{Equation 4}$$

(In Equations 3 and 4, R indicates the number of bits in one GOP when the GOP is encoded.)

That is, the mode decision may be made, (a) considering the calculation complexity, (2) using an optimizing method that considers calculation complexity to a certain degree in predicting the bit amounts to be transmitted, or (3) predicting or obtaining the actual bit amounts.

FIG. 22 shows the comparison graph of bit rate-PSNR results at QCIF and CIF for "Crew" QCIF and CIF video sequences, wherein among the results, one is based on a SVM 3.0 codec proposed by HHI for SVC, and the other is based on an adaptive GOP structure proposed in the present invention. In the above example, the encoding based on the adaptive GOP structure according to the present invention is performed for the GOP size of 16, or N=4 and M=1 in the algorithm of FIG. 16, and uses the MSE values between each frame reconstructed per sub-band after the hierarchical B-picture prediction is performed and each frame reconstructed per sub-band after the encoding is performed, in determining the sub-GOP sizes. The resulting graph shows that the encoding based on the adaptive GOP structure according to the present invention improves performance from about 0.02 dB to 0.45 dB in comparison with the results of the existing SVM 3.0 encoding method.

FIG. 23 shows the comparison graph of results of encoding "Crew" video sequence at 4-CIF, wherein one is based on the HHI's codec and the other is based on the adaptive GOP structure according to the present invention. It is shown that the coding scheme according to the present invention improves performance from about 0.18 dB to 0.43 dB.

FIG. 24 shows the GOP structure for "Crew" QCIF 15 Hz video sequence, which is adaptively divided in accordance with the present invention. It can be concluded that the GOP size is divided according to the variation of motion, and coding efficiency is improved.

FIG. 25 shows the results of the hierarchical B-picture construction based the adaptive GOP structure according to the present invention and based on HHI codec for $64^{th}$ to $80^{th}$ frames of "Crew" video sequence.

FIG. 26 shows the quality comparison between the frames, which are obtained by the HHI codec and the adaptive GOP structure-based encoding of the present invention, respectively, with respect to the $241^{st}$ frame of "Crew" video sequence. As shown in the left figure, it can be concluded from the result from the HHI codec that there is a blurring phenomenon in the hand part at a left-highlighted portion of the frame and a color spread phenomenon at a right-highlighted portion of the frame. In contrast, as shown in the right figure, it can be concluded from the result of the adaptive GOP structure-based encoding of the present invention that the hand part is not seriously blurred and there is no color spread.

FIG. 27 shows the quality comparison between the frames, which are obtained by the HHI codec and the adaptive GOP structure-based encoding of the present invention, respectively, with respect to the $279^{th}$ frame of "Crew" video sequence. As shown in the left figure, it can be concluded from the resultant frame of the HHI codec that there are serious blocking artifacts at the highlighted portion of the frame.

FIG. 28 shows the quality comparison between the frames, which are obtained by the HHI codec and the adaptive GOP structure-based encoding of the present invention, respectively, with respect to the $298^{th}$ frame of "Crew" video sequence. As shown in the left figure, it can be concluded from the result picture of the HHI codec that the color spread phenomenon is prominent at the highlighted portion of the frame.

FIG. 29 shows the comparison graph of the results based on the HHI codec and the adaptive GOP structure-based encoding of the present invention with respect to "Football" sequence at QCIF and CIF. As shown, the encoding results according to the present invention show that performance is improved from about 0.01 dB to 0.15 dB.

FIG. 30 shows the comparison graph of the results based on the HHI codec and the adaptive GOP structure-based encoding of the present invention with respect to 4-CIF of "Football" video sequence. As shown, the encoding results according to the present invention show that performance is further improved from about 0.06 dB to 0.14 dB.

FIG. 31 shows the GOP structure for "Football" QCIF 15 Hz video sequence, which is adaptively divided in accordance with the present invention. It can be concluded that the GOP is divided according to a degree of motion, and coding efficiency is improved.

FIG. 32 shows the comparison graph of the results based on the HHI codec and the adaptive GOP structure-based encoding of the present invention with respect to "Football" video sequence at QCIF and CIF. As shown, the encoding result according to the present invention shows that performance is improved from about 0.15 dB to 0.65 dB.

FIG. 33 shows the GOP structure for "Football" QCIF 15 Hz video sequence, which is adaptively divided in accordance with the present invention. It can be concluded that the GOP is divided according to a degree of motion, and coding efficiency is improved.

In order to decode a bitstream encoded by the above-mentioned method for adaptive GOP structure-based encoding in accordance with one embodiment of the present invention, in one example, the AVC technique as the current international video standard may be used. A highest level of B-picture ("B4" in the 16-sized GOP encoding) may be encoded and transmitted as a "non-reference picture" through a RPLR (Reference Picture List Reordering) instruction, and then be subjected to intra frame coding and transmission through MMCO (Memory Management Control Operation) instruction. Thereby, B-pictures of the previous GOP may be marked with an "unused for reference" and removed from a decoded picture buffer.

In another example, the GOP size information may be encoded and transmitted into a header of a beginning frame of a GOP, and thereby the adaptively-divided GOP may be decoded. As one example, 1 bit for "Variable-GOP-Size" is allocated in a header of a bitstream to indicate the use of the variable GOP size to the decoder, and then decoding can be performed suitably in the corresponding conditions.

According to another embodiment of the present invention, in order to decode the encoded bitstream at a decoder, an encoder can add a "gop_divide_bit" as one bit flag to the front of each GOP-based bitstream and then transmits it to the decoder, wherein the "gop_divide_bit" indicates whether to divide a GOP. This may be performed by slightly modifying the mode decision process shown in FIG. 21. In other words, difference values obtained from encoding based on the different GOP sizes from the maximum $2^N$-sized GOP to the minimum $2^M$-sized GOP, with respect to a $2^N$-frame video sequence, are compared with each other (S2110). As a result of the comparison, if the difference value obtained by the $2^N$-sized GOP-based encoding is the smallest (S2120), the $2^N$-sized GOP is selected and, at the same time, the flag "gop_divide_bit" is set to '0'. Otherwise, the flag "gop_divide_bit" is set to '1' to indicate that the GOP is divided. The other steps S2140 to S2160 may be performed in the same manner.

FIG. 35 shows a configuration of a GOP bitstream to which "gop_divide_bit" is added in accordance with one embodiment of the present invention. FIG. 36 shows an example of a bitstream constructed from the result of performing the adaptive GOP structure-based coding of the present invention, when the predetermined GOP size 16 (i.e., N=4 and M=0), the GOP is divided into sub-GOPs of (2, 2, 4, 8).

A decoding algorithm for an encoded bitstream, which the flag "gop_divide_bit" is added thereto, is explained below. In this case, a value of N, which is a power of the original (non-divided) GOP size, will be transmitted together.

(1) The flag "gop_divide_bit" in the bitstream corresponding to the $2^N$-frame size is examined.
  A. If the flag is '0', the $2^N$-frame GOP is decoded, and
  B. If the flag is '1', N is decreased by 1 (here, N=N−1).
(2) With respect to the front $2^N$-frame GOP and the rear $2^N$-frame GOP, the process (1) is performed respectively.

FIG. 35 shows an example of a process of decoding the encoded bitstream shown in FIG. 34 in accordance with one embodiment of the present invention.

(1) The flag "gop_divide_bit" is decoded and read out in the bitstream. As a result, because the flag has a value of '1', it is determined that the 16-sized GOP has been divided. Accordingly, the front 8 frames are subjected to the following process (2), and the rear 8 frames are subjected to the following process (3).

(2) The flag "gop_divide_bit" is decoded and read out in the bitstream of the front 8 frames. As a result, because the flag has a value of "1", it is determined that the 8-sized GOP has been divided. Thus, the front 4 frames are subjected to the following process (4), and the rear 4 frames are subjected to the following process (5).

(3) The flag "gop_divide_bit" is decoded and read out in the rear bitstream of 8 frames. As a result, because the flag has a value of '0', an 8-frame GOP bitstream is decoded, and the decoded image frames may be obtained.

(4) The flag "gop_divide_bit" is decoded and read out in the bitstream of the front 4 frames. As a result, because the flag has a value of '1', it is determined that the 4-sized GOP has been divided. Thus, the front 2 frames are subjected to the following process (6), and the rear 2 frames are subjected to the following process (7):

(5) The flag "gop_divide_bit" is decoded and read out in the bitstream of the rear 4 frames. As a result, because the flag has a value of '0', the 4-frame GOP bitstream is decoded, and the decoded image frames may be obtained.

(6) The flag "gop_divide_bit" is decoded and read out in the bitstream of the front 2 frames. As a result, because the flag has a value of '0', the 2-frame GOP bitstream is decoded, and the decoded image frames may be obtained.

(7) The flag "gop_divide_bit" is decoded and read out in the bitstream of the rear 2 frames. As a result, because the flag has a value of '0', the 2-frame GOP bitstream is decoded, and the decoded image frames may be obtained.

According to yet another embodiment of the present invention, an encoder of performing the adaptive GOP structure-based video coding according to the present invention can encode information on sub-GOPs, which are adaptively divided within the constant GOP size, and then transmit it to a decoder. FIG. 37 shows an example of the selected GOP mode in a 16 frame-sized GOP.

In one example, when the encoding is performed based on 16 frame-sized GOP (i.e., N=4 and M=1), the original GOP size information is encoded in a sequence header and the information on sub-GOPs, which are adaptively divided within the 16 frame-sized GOP, is encoded in the slice header of a first frame of each GOP. The sub-GOP information is represented by the sub-GOP size divided by "N" of the original GOP size, $2^N$, i.e., 4. Then, each of the divided information is encoded in two fixed bits. For example, if the 16-sized GOP is selected as the sub-GOP, the information is encoded in "00b". If the 8-sized GOP is selected as the sub-GOP, the information is encoded in "01b". If the 4-sized GOP is selected as the sub-GOP, the information is encoded in "10b". If the 2-sized GOP is selected as the sub-GOP, the information is encoded in "11b". When the sum of the GOP sizes selected as the sub-GOPs within the 16 frame size is 16, the encoding of the selected GOP information is terminated. For example, if the sub-GOPs are determined as the sizes of 8, 4, 4, a total of 6 bits, 01-10-10, are needed. If the sub-GOPs are determined as the sizes of 16, a total of 2 bits, 00, are needed. If the sub-GOPs are determined as the sizes of 4, 2, 2, 8, a total of 8 bits, 10-11-11-01, are needed. If the sub-GOPs are determined as the sizes of 2, 2, 2, 2, 2, 2, 2, 2, a total of 16 bits, 11-11-11-11-11-11-11-11, are needed. In this manner, the sub-GOP information can be expressed. In the case of transmitting the sub-GOP information on the encoder side together with the bitstream, the decoder decodes each GOP on the basis of the received sub-GOP information.

In an embodiment of the present invention, the decoder may provide temporal scalability upon decoding a bitstream encoded based on the adaptively divided GOP structure. According to an embodiment of the present invention, the bitstream encoded based on the adaptively divided GOP structure should be decoded according the order of frames because it is different in a structure from a bitstream encoded based on the fixed GOP size.

For example, as shown in FIG. 38, when the sub-GOPs are selected and encoded with the size of (8, 4, 2, 2) in the 16-frame GOP, the order of bitstream is determined based on each temporal resolution as follows:

Total resolution: I(0), B1(1), B2(2), B2(3), B3(4), B3(5), B3(6), B3(7), I(8), B1(9), B2(10), B2(11), I(12), B1(13), I(14) and B1(15).

½ resolution: I(0), B1(1), B2(2), B2(3), I(8), B1(9), I(12) and I(14).

¼ resolution: I(0), B1(1), I(8) and I(14).

⅛ resolution: I(0) and I(14).

1/16 resolution: I(14).

FIG. 39 shows a 1/L resolution-supported algorithm performed to provide temporal scalability at a bitstream extractor in a decoder in accordance with one embodiment of the present invention. The following is a video extraction algorithm for supporting 1/L resolution of a bitstream encoded based on an adaptive GOP structure-based encoding method of the present invention. It is assumed that the GOP size is 16.

(1) A value of k is initially set to 0 (here, k is an integer) (S3910).

(2) A value of FrameNum is initially set to $2^N$ (S3920).

(3) It is detected whether or not there is a low-frequency frame in the bitstream from the FrameNum$^{th}$ frame to the L$^{th}$ frame in a reverse direction (S3930), and FrameNum is decreased by L (S3940).

(4) Based on the detecting result in step (3) (S3950),
  (i) if there is no low-frequency frame, the value of k is increased by 1 (S3970), and
  (ii) if there is a low-frequency frame, the low-frequency frame detected first in the inverse direction is selected, and if the value of k is not 0, k number of subsequent high-frequency frames are also selected, and then the value of k is set to 0 again (S3960).

(5) Steps (3) and (4) are repeated until FramNum reaches 0 (S3980), and $2^N$/L number of frames are finally selected.

For example, the above-mentioned algorithm for supporting the ⅛ resolution of the encoded bitstream where the sub-GOP sizes are selected as (8, 4, 2, 2) in the 16-frame GOP is executed as follows. Provided that the entire bitstream is configured of "I(0), B1(1), B2(2), B2(3), B3(4), B3(5), B3(6), B3(7), I(8), B1(9), B2(10), B2(11), I(12), B1(13), I(14) and B1(15)":

(1) A parameter k is initially set to 0.
(2) FrameNum is initially set to 16.
(3) A low-frequency frame is detected from the FrameNum $(=16)^{th}$ bitstream B1(15) in a reverse direction, and FrameNum is decreased by 8 (i.e., FrameNum=FrameNum−8).
(4) Based on the detecting result in step (3), the low-frequency frame, I(14), is selected.
(5) The low-frequency frame is detected from the FrameNum $(=8)^{th}$ bitstream B3(7) in a reverse direction, and FrameNum is decreased by 8 (FrameNum=FrameNum−8).
(6) Based on the detecting result in step (5), the low-frequency frame, I(0), is selected.
(7) Since FrameNum is 0, the algorithm is terminated, As a result of executing the algorithm, it can be seen that two frames I(0) and I(14) are selected in order to support the ⅛ resolution.

An example of supporting a ¼ resolution is as follows:
(1) A parameter k is initially set to 0.
(2) FrameNum is initially set to 16.
(3) A low-frequency frame is detected from a FrameNum $(=16)^{th}$ bitstream B1(15) in a reverse direction, and FrameNum is decreased by 4 (FrameNum=FrameNum−4).
(4) Based on the detecting result in step (3), the low frequency frame I(14) is selected.
(5) Since FrameNum (=12) is not '0', the low-frequency frame is detected from the $12^{th}$ bitstream B2(10) in a reverse direction, and FrameNum is decreased by 4 (FrameNum=FrameNum−4).
(6) Based on the detecting result in step (5), I(8) is selected.
(7) Since FrameNum (=8) is not '0', the low-frequency frame is detected from the $8^{th}$ bitstream B3(7) in a reverse direction, and FrameNum is decreased by 4 (FrameNum=FrameNum−4).
(8) Based on the detecting result in step (7), k is increased by 1 because there is no low-frequency frame.
(9) Since FrameNum (=4) is not '0', the low-frequency frame is detected from the $4^{th}$ bitstream B2(3) in a reverse direction, and FrameNum is decreased by 4 (FrameNum=FrameNum−4).
(10) Based on the detecting result in step (9), the low-frequency frame I(0) is selected. Then, because k is 1, the next frame B1(1) is selected, and k is set to 0 again.
(11) Since FrameNum is 0, the algorithm is terminated. As a result of executing the algorithm, it can be seen that four frames I(0), B1(1), I(8), and I(14) are selected in order to support the ¼ resolution.

According to another embodiment of the present invention, the encoder may provide desired temporal scalability upon encoding a video based on the adaptive GOP structure, by adjusting a level of a sub-GOP (i.e., a selectable minimum size of the sub-GOP) selected in the mode decision process. For example, when the GOP size is $2^N$ (generally, N≧4), mode decision performed by comparing the encoding results based on $2^N$ sized sub-GOP, $2^{N-1}$ sized sub-GOP, $2^{N-2}$ sized sub-GOP, and $2^{N-3}$ sized sub-GOP units to each other to provide $1/2^{N-3}$ or more temporal scalability is defined as to "Level_1", mode decision performed by comparing the encoding results based on $2^N$ sized sub-GOP, $2^{N-1}$ sized sub-GOP, and $2^{N-2}$ sized sub-GOP units to each other to provide $1/2^{N-2}$ or more temporal scalability is defined to as "Level_2", and mode decision performed by comparing encoding result values based on $2^N$ sized sub-GOP and $2^{N-1}$ sized sub-GOP units to each other to provide $1/2^{N-1}$ or more temporal scalability is defined to as "Level_3". The encoder may encode level information of the mode decision and transmit it to a decoder (extractor), in order to notify a supportable range of the temporal scalability. The following Table 1 shows the range of the temporal scalability that can be provided depending on levels of the mode decision.

TABLE 1

| Level | Supportable temporal scalability |
|---|---|
| Level_1 | $1/2^{N-3}$ or more |
| Level_2 | $1/2^{N-2}$ or more |
| Level_3 | $1/2^{N-1}$ or more |

An example of the above-described method will be described. In case that the encoding of a video sequence at 15 Hz is performed based on $2^4$ frame-sized GOP, the level information is encoded and transmitted. The level information is defined as follows.

When the comparison of the encoding results based on $2^4$ frame-sized GOP, $2^3$ frame-sized GOP, $2^2$ frame-sized GOP, and $2^1$ frame-sized GOP to each other is performed to provide 7.5 Hz ($1/2^{4-3}=1/2$) or more temporal scalability, the level information is defined as Level_1. When the comparison of the encoding results based on $2^4$ frame-sized GOP, $2^3$ frame-sized GOP, and $2^2$ frame-sized GOP units to each other is performed to provide 3.75 Hz ($1/2^{4-2}=1/4$) or more temporal scalability, it is defined as Level_2, and when the comparison of the encoding results based on $2^4$ frame-sized GOP and $2^3$ frame-sized GOP units to each other is performed to provide 1.875 Hz ($1/2^{4-1}=1/8$) or more temporal scalability, it is defined as Level_3.

That is, in order to provide a certain temporal scalability among the three temporal scalability modes, the encoder encodes the corresponding level information transmits it to the decoder (e.g., for SVC, in order to provide the specific temporal scalability among the three temporal scalability modes, the encoder encodes the corresponding level information and transmits it to the extractor). In one instance, the encoder may encode Level_1 into "0", Level_2 into "10", and Level_1 into "11". In another instance, the encoder may encode Level_1 into "1", Level_2 into "010", and Level_3 into "011". It will be appreciated by those skilled in the art that the level information may be encoded by any other manners and the present invention is not limited to the above-mentioned manners.

To transmit the supportable temporal scalability level information to the extractor of the decoder as described above, a flag may be added to the scalability Information, SEI message, of JSVM (Joint Scalable Video Model) 2.0, as shown in FIG. 40.

A flag "use_adaptive_gop_structure_flag" in a hatched area of FIG. 40 is a flag indicating whether the adaptive GOP structure is used upon encoding a video, in which a value of 1 indicates that the adaptive GOP structure has been used. Further, "sub_gop_level" indicates a sub-GOP level of the adaptive GOP structure to notify a temporal scalability level that is supportable to the extractor.

The present invention described above may be provided as one or more computer-readable mediums that are implemented on at least one manufactured object. The manufactured object may be a floppy disc, a hard disc, a CD ROM, a flash memory card, a PROM, a RAM, a ROM, or a magnetic tape. Generally, computer-readable programs may be implemented by any programming language. The language includes C, C++, or JAVA.

Although exemplary embodiments of the present invention have been described with reference to the attached drawings, the present invention is not limited to these embodiments, and it should be appreciated to those skilled in the art that a variety of modifications and changes can be made without departing from the spirit and scope of the present invention.

The invention claimed is:

1. A method for performing hierarchical B picture-based coding on a video sequence, the method comprising the steps of:
   (a) for each predetermined $2^N$-frame-sized GOP of the video sequence,
      (a1) encoding the $2^N$ frame-sized GOP of the video sequence based on each of the different GOP sizes from the maximum size, $2^N$, to the minimum size, $2^M$ (M is an integer between 1 and N) and selecting at least one sub-GOP based on the encoding result by
         (a1-i) comparing the difference values obtained from the encoding based on each of the different GOP sizes from $2^N$ to $2^M$ and, if the difference value obtained from the encoding based on the $2^N$-sized GOP unit is the smallest, selecting the $2^N$-sized GOP as a sub-GOP; and
         (a1-ii) if the difference value obtained from the encoding based on the $2^N$-sized GOP is not the smallest, after decreasing N by 1 (i.e., N=N−1), selecting two $2^M$-sized GOPs as the sub-GOPs if N has the same value as M, and repeating steps (a1-i) and (a2-ii) for each of the front $2^N$ frames and the rear $2^N$ frames, if N does not have the same value as M; and
      (a2) generating a bitstream by encoding the $2^N$-frame-sized GOP based on the at least one selected sub-GOP;
   (b) decoding each $2^N$ frame-sized GOP bitstream; and
   (c) providing 1/L temporal scalability for each predetermined $2^N$ frame-sized GOP bitstream by:
      (c1) initializing "k" to 0 (k is an integer);
      (c2) initializing "FrameNum" to $2^N$;
      (c3) detecting whether there is a low-frequency frame in a bitstream from FrameNum$^{th}$ frame to L$^{th}$ frame in the reverse direction, and decreasing Frame Num by L;
      (c4) based on the result of detecting in the step (c3),
         (c4-i) increasing the value of k by 1, if there is no low-frequency frame, and
         (c4-ii) selecting the low-frequency frame detected first in the reverse direction if there is a low-frequency picture and, if the value of k is not 0, further selecting subsequent k number of high-frequency frames and then reinitializing k to 0; and
      (c5) repeating the steps (c3) and (c4) until FrameNum reaches 0, and finally selecting $2^N/L$ number of frames.

2. The method of claim 1, wherein the range of temporal scalability is based on the minimum size, $2^M$, of the selected sub-GOP.

3. The method of claim 1, wherein the temporal scalability range that can be supported is one of at least $\frac{1}{2}^{N-1}$, at least $\frac{1}{2}^{N-2}$, or at least $\frac{1}{2}^{N-3}$.

4. A method for decoding a hierarchical B picture-based encoded bitstream, the method comprising the steps of: for each predetermined $2^N$-sized GOP bitstream,
   (a) reading and checking a value of a bit indicating whether the GOP is divided;
   (b) when the bit value is "0", decoding the GOP bitstream;
   (c) when the bit value is "1", dividing the GOP bitstream into a front half-sized GOP bitstream and a rear half-sized GOP bitstream;
   (d) repeating the steps (a) through (d) for each of the front GOP bitstream and the rear GOP bitstream, respectively; and
   (e) providing 1/L temporal scalability for each predetermined $2^N$ frame-sized GOP bitstream by:
      (e1) initializing "k" to 0 (k is an integer);
      (e2) initializing "FrameNum" to $2^N$;
      (e3) detecting whether there is a low-frequency frame in a bitstream from FrameNum$^{th}$ frame to L$^{th}$ frame in the reverse direction, and decreasing Frame Num by L;
      (e4) based on the result of detecting in the step (e3),
         (e4-i) increasing the value of k by 1, if there is no low-frequency frame, and
         (e4-ii) selecting the low-frequency frame detected first in the reverse direction if there is a low-frequency picture and, if the value of k is not 0, further selecting subsequent k number of high-frequency frames and then reinitializing k to 0; and
      (e5) repeating the steps (e3) and (e4) until FrameNum reaches 0, and finally selecting $2^N/L$ number of frames.

5. A method for decoding a hierarchical B picture-based encoded bitstream, the method comprising the steps of: for a predetermined-sized GOP bitstream,
   (a) determining whether the GOP is divided;
   (b) when the GOP is determined not to be divided, decoding the GOP bitstream;
   (c) when the GOP is determined to be divided, dividing the GOP bitstream;
   (d) decoding the divided GOP bitstreams; and
   (e) providing 1/L temporal scalability for each predetermined $2^N$ frame-sized GOP bitstream by:
      (e1) initializing "k" to 0 (k is an integer);
      (e2) initializing "FrameNum" to $2^N$;
      (e3) detecting whether there is a low-frequency frame in a bitstream from FrameNum$^{th}$ frame to L$^{th}$ frame in the reverse direction, and decreasing Frame Num by L;
      (e4) based on the result of detecting in the step (e3),
         (e4-i) increasing the value of k by 1, if there is no low-frequency frame, and
         (e4-ii) selecting the low-frequency frame detected first in the reverse direction if there is a low-frequency picture and, if the value of k is not 0, further selecting subsequent k number of high-frequency frames and then reinitializing k to 0; and
      (e5) repeating the steps (e3) and (e4) until FrameNum reaches 0, and finally selecting $2^N/L$ number of frames.

6. The method of claim 5, further comprising repeating steps (a) through (c) for each of the divided GOP bitstreams prior to performing the step (d).

7. A method for decoding a hierarchical B picture-based encoded bitstream, the method comprising the steps of: for each predetermined $2^N$-sized GOP bitstream, reading adaptively-divided GOP structure information from the GOP bitstream; decoding the GOP bitstream based on the adaptively-divided GOP structure information; and providing 1/L temporal scalability for each predetermined $2^N$ frame-sized GOP bitstream by:
   (a) initializing "k" to 0 (k is an integer);
   (b) initializing "FrameNum" to $2^N$;
   (c) detecting whether there is a low-frequency frame in a bitstream from FrameNum$^{th}$ frame to L$^{th}$ frame in the reverse direction, and decreasing Frame Num by L;
   (d) based on the result of detecting in the step (c),
      (d1) increasing the value of k by 1, if there is no low-frequency frame, and
      (d2) selecting the low-frequency frame detected first in the reverse direction if there is a low-frequency picture and, if the value of k is not 0, further selecting subsequent k number of high-frequency frames and then reinitializing k to 0; and (e) repeating the steps (c) and (d) until FrameNum reaches 0, and finally selecting $2^N/L$ number of frames, wherein the structure information comprises the original GOP size information in a sequence header and information on sub-GOPs is in a slice header of a first frame of each GOP.

8. A method for providing 1/L temporal scalability upon decoding a hierarchical B picture-based encoded bitstream, the method comprising the steps of: for each predetermined $2^N$-frame-sized GOP bitstream, (a) initializing "k" to 0 (k is an integer);
(b) initializing "FrameNum" to $2^N$;
(c) detecting whether there is a low-frequency frame in a bitstream from FrameNum$^{th}$ frame to $L^{th}$ frame in the reverse direction, and decreasing FrameNum by L;
(d) based on the result of detecting in the step (c),
(d1) increasing the value of k by 1, if there is no low-frequency frame, and
(d2) selecting the low-frequency frame detected first in the reverse direction if there is a low-frequency picture and, if the value of k is not 0, further selecting subsequent k number of high-frequency frames and then re-initializing k to 0; and
(e) repeating the steps (c) and (d) until FrameNum reaches 0, and finally selecting $2^N/L$ number of frames.

9. A computer-readable recording medium having a computer program stored therein for performing the method for providing 1/L temporal scalability according to claim 8.

10. A method for decoding a hierarchical B picture-based encoded bitstream, the method comprising the steps of: for a predetermined-sized GOP bitstream, reading variable GOP information from a data structure of the GOP bitstream, wherein the data structure comprises information about a variable GOP size in a header of the GOP bitstream;
decoding the GOP bitstream based on the variable GOP information, and
providing 1/L temporal scalability for each predetermined $2^N$ frame-sized GOP bitstream by:
(a) initializing "k" to 0 (k is an integer);
(b) initializing "FrameNum" to $2^N$;
(c) detecting whether there is a low-frequency frame in a bitstream from FrameNum$^{th}$ frame to $L^{th}$ frame in the reverse direction, and decreasing Frame Num by L;
(d) based on the result of detecting in the step (c3),
(d1) increasing the value of k by 1, if there is no low-frequency frame, and
(d2) selecting the low-frequency frame detected first in the reverse direction if there is a low-frequency picture and, if the value of k is not 0, further selecting subsequent k number of high-frequency frames and then reinitializing k to 0; and
(e) repeating the steps (c) and (d) until FrameNum reaches 0, and finally selecting $2^N/L$ number of frames.

11. A method for decoding a hierarchical B picture-based encoded bitstream, the method comprising the steps of: for a predetermined-sized GOP bitstream, reading variable GOP information from a data structure of the GOP bitstream, wherein the data structure comprises information indicating whether each GOP is divided;
decoding the GOP bitstream based on the variable GOP information, and
providing 1/L temporal scalability for each predetermined $2^N$ frame-sized GOP bitstream by:

(a) initializing "k" to 0 (k is an integer);
(b) initializing "FrameNum" to 2N;
(c) detecting whether there is a low-frequency frame in a bitstream from FrameNum$^{th}$ frame to $L^{th}$ frame in the reverse direction, and decreasing Frame Num by L;
(d) based on the result of detecting in the step (c3),
(d1) increasing the value of k by 1, if there is no low-frequency frame, and
(d2) selecting the low-frequency frame detected first in the reverse direction if there is a low-frequency picture and, if the value of k is not 0, further selecting subsequent k number of high-frequency frames and then reinitializing k to 0; and
(e) repeating the steps (c) and (d) until FrameNum reaches 0, and finally selecting $2^N/L$ number of frames.

12. A method for performing hierarchical B picture-based coding on a video sequence, the method comprising the steps of:

(a) for each predefined $2^N$ frame-sized group of pictures (GOP) of the video sequence,
(a1) encoding the $2^N$ frame-sized GOP of the video sequence based on each of the different GOP sizes from the maximum size, $2^N$, to the minimum size, $2^M$ (M is an integer between 1 and N) and selecting at least one sub-GOP based on the encoding result, and
(a2) generating a bitstream by encoding the $2^N$-frame-sized GOP based on the at least one selected sub-GOP; and
(b) decoding each $2^N$ frame-sized GOP bitstream; and
(c) providing 1/L temporal scalability for each predetermined $2^N$ frame-sized GOP bitstream by:
(c1) initializing "k" to 0 (k is an integer);
(c2) initializing "FrameNum" to $2^N$;
(c3) detecting whether there is a low-frequency frame in a bitstream from FrameNum$^{th}$ frame to $L^{th}$ frame in the reverse direction, and decreasing Frame Num by L;
(c4) based on the result of detecting in the step (c3),
(c4-i) increasing the value of k by 1, if there is no low-frequency frame, and
(c4-ii) selecting the low-frequency frame detected first in the reverse direction if there is a low-frequency picture and, if the value of k is not 0, further selecting subsequent k number of high-frequency frames and then reinitializing k to 0; and
(c5) repeating the steps (c3) and (c4) until FrameNum reaches 0, and finally selecting $2^N/L$ number of frames.

13. The method for performing motion compensated temporal filtering hierarchical B picture-based encoding on a video sequence according to claim 12, wherein step (a1) further comprises obtaining different values between frames reconstructed after the encoding is performed and frames after the hierarchical B-picture prediction is performed, based on each of the different GOP sizes and wherein the selecting at least one sub-GOP based on the encoding result comprises selecting at least one sub-GOP based on the difference values obtained by encoding the $2^N$ frame-sized GOP of the video sequence based on each of the different GOP sizes;

(a1-i) comparing the difference values obtained from the encoding based on each of the different GOP sizes from $2^N$ to $2^M$ and, if the difference value obtained from the encoding based on the $2^N$-sized GOP unit is the smallest, selecting the $2^N$-sized GOP as a sub-GOP; and (a1-ii) if the difference value obtained from the encoding based on the $2^N$-sized GOP is not the smallest, after decreasing N by 1 (i.e., N=N−1), selecting two $2^M$-sized GOPs as the sub-GOPs if N has the same value as M, and repeating steps (a1-i) and (a2-ii) for each of the front $2^N$ frames and the rear $2^N$ frames, if N does not have the same value as M.

14. The method of claim 13, wherein the difference value is selected from a group of MSE (Mean Square Error), SAD (Sum of Absolute Differences), SSE (Sum of Squared Errors), SAD+$\lambda_{SAD}$R (R is the number of bits of the GOP unit), and SSE+$\lambda_{SSE}$R.

15. The method of claim 14, wherein the MSE has the difference value calculated by the following Equation 5:

$$MSE(k) = \frac{1}{k}\sum_{i=0}^{k}[F(i)-G(i)]^2 \quad \text{[Equation 5]}$$

where k is the number of pixels in one frame, F(i) is the pixel value of the frame after the hierarchical B-picture prediction is performed, and G(i) is the pixel value of the frame reconstructed after the encoding is performed.

16. The method of claim 13, wherein the step (b) further includes setting a GOP divide bit inserted before the GOP bitstream as "0".

17. The method of claim 13, further comprising a step of setting the at least one selected sub-GOP information in the first frame header information of the GOP to transmit to a decoder.

18. A computer-readable recording medium having a computer program stored therein for performing the hierarchical B picture-based coding method according to any one of claims 13 to 3 and 12.

19. A computer-readable recording medium having a computer program stored therein for performing the method for decoding a hierarchical B-picture-based encoded bitstream according to any one of claims 4 to 7, 10, and 11.

* * * * *